(12) United States Patent
Chiskis et al.

(10) Patent No.: US 11,233,539 B2
(45) Date of Patent: Jan. 25, 2022

(54) DATA TRAFFIC-AWARE DYNAMIC VECTORING

(71) Applicant: Sckipio Technologies S.I LTD, Ramat Gan (IL)

(72) Inventors: Alexander Chiskis, Tel Aviv (IL); Rami Verbin, Tel Aviv (IL)

(73) Assignee: Sckipio Technologies S.I LTD., Ramat Gan (IL)

( * ) Notice: Subject to any disclaimer, the term of this patent is extended or adjusted under 35 U.S.C. 154(b) by 0 days.

(21) Appl. No.: 17/288,304

(22) PCT Filed: Oct. 23, 2019

(86) PCT No.: PCT/IL2019/051147
§ 371 (c)(1),
(2) Date: Apr. 23, 2021

(87) PCT Pub. No.: WO2020/084617
PCT Pub. Date: Apr. 30, 2020

(65) Prior Publication Data
US 2021/0314024 A1 Oct. 7, 2021

Related U.S. Application Data

(60) Provisional application No. 62/749,137, filed on Oct. 23, 2018.

(51) Int. Cl.
*H04B 3/32* (2006.01)
*H04B 7/0452* (2017.01)
*H04B 7/0456* (2017.01)

(52) U.S. Cl.
CPC ............. *H04B 3/32* (2013.01); *H04B 7/0452* (2013.01); *H04B 7/0456* (2013.01)

(58) Field of Classification Search
CPC ...... H04B 3/32; H04B 7/0452; H04B 7/0456; H04L 25/03057; H04L 25/0202; H04L 25/03114; H04L 25/03343
See application file for complete search history.

(56) References Cited

U.S. PATENT DOCUMENTS

2009/0325591 A1* 12/2009 Liu ...................... H04B 7/0478
455/452.2
2011/0045783 A1* 2/2011 Luschi .............. H04L 25/03343
455/69
2019/0356364 A1* 11/2019 Maamari ............... H04L 5/0062

FOREIGN PATENT DOCUMENTS

EP  2675099 A1  12/2013
WO  2014180794 A1  11/2014
WO  2018004855 A1  1/2018

OTHER PUBLICATIONS

Crosstalk Mitigation Techniques for Digital Subscriber Line Systems, (retrieved on Dec. 1, 2020). Retrieved from the Internet: <https://d-nb.info/1096328941/34> Dungen M. Jan. 13, 2016 (Jan. 13, 2016) Chapters IV-VII.

(Continued)

*Primary Examiner* — Vineeta S Panwalkar
(74) *Attorney, Agent, or Firm* — Brown Rudnick LLP

(57) ABSTRACT

A method employing traffic-aware vectoring for transceiving data between a network side entity defining a network side, and at least two nodes defining a subscriber side, via a multiple-input multiple-output (MIMO) communication channel, over a plurality of subcarrier frequencies, the method comprising: determining an allocation that allocates each of said subcarrier frequencies for preceding with either one of a steady-state precoder, and at least one dynamic precoder; monitoring downstream data traffic from said network side entity toward said at least two nodes; and constructing said at least one dynamic precoder to optimize (Continued)

a bit-rate of said downstream data traffic, according to said monitoring, and said allocation; wherein said at least one dynamic precoder is configured to change with varying said data traffic conditions.

20 Claims, 8 Drawing Sheets

(56) References Cited

OTHER PUBLICATIONS

Written Opinion dated Jan. 20, 2020 for International Application No. PCT/IL2019/051147 (4 pages).
International Search Report dated Jan. 20, 2020 for International Application No. PCT/IL2019/051147 (5 pages).

* cited by examiner

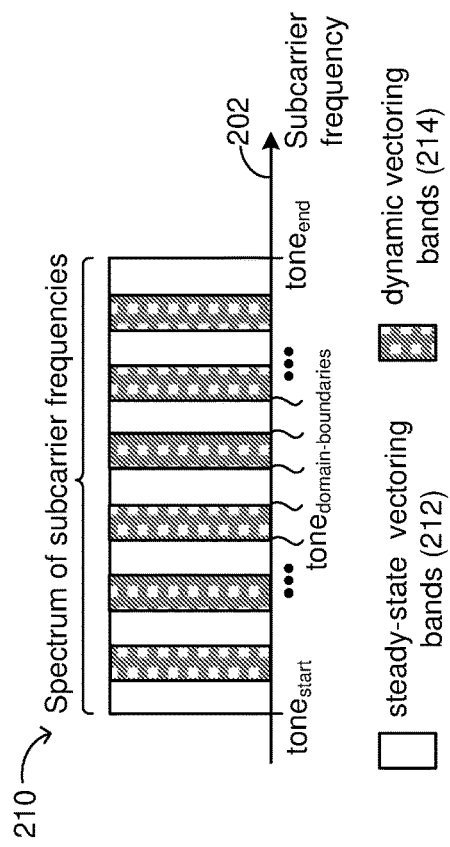
FIG. 5B
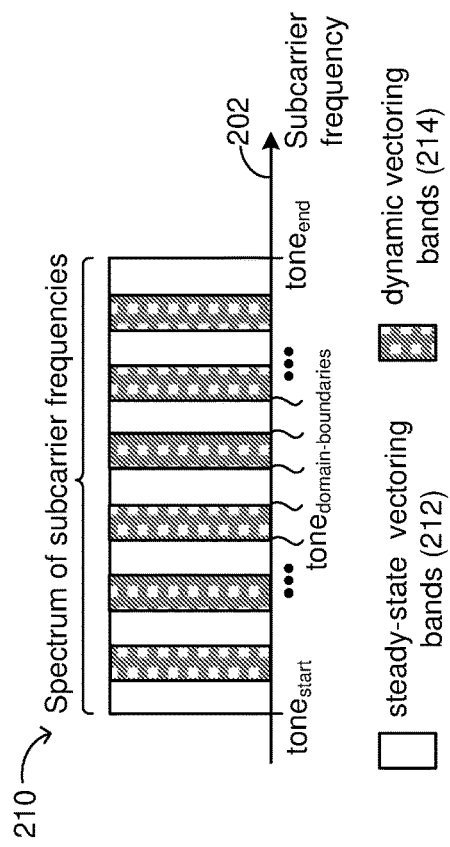
FIG. 5C
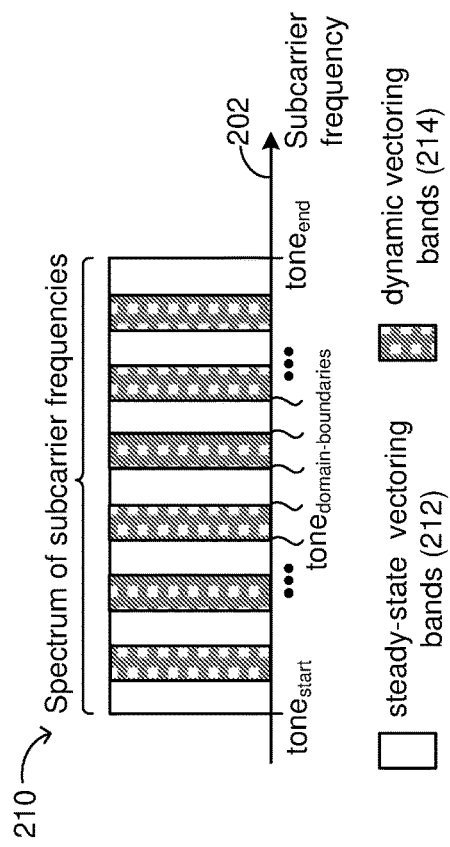
FIG. 4
FIG. 5A

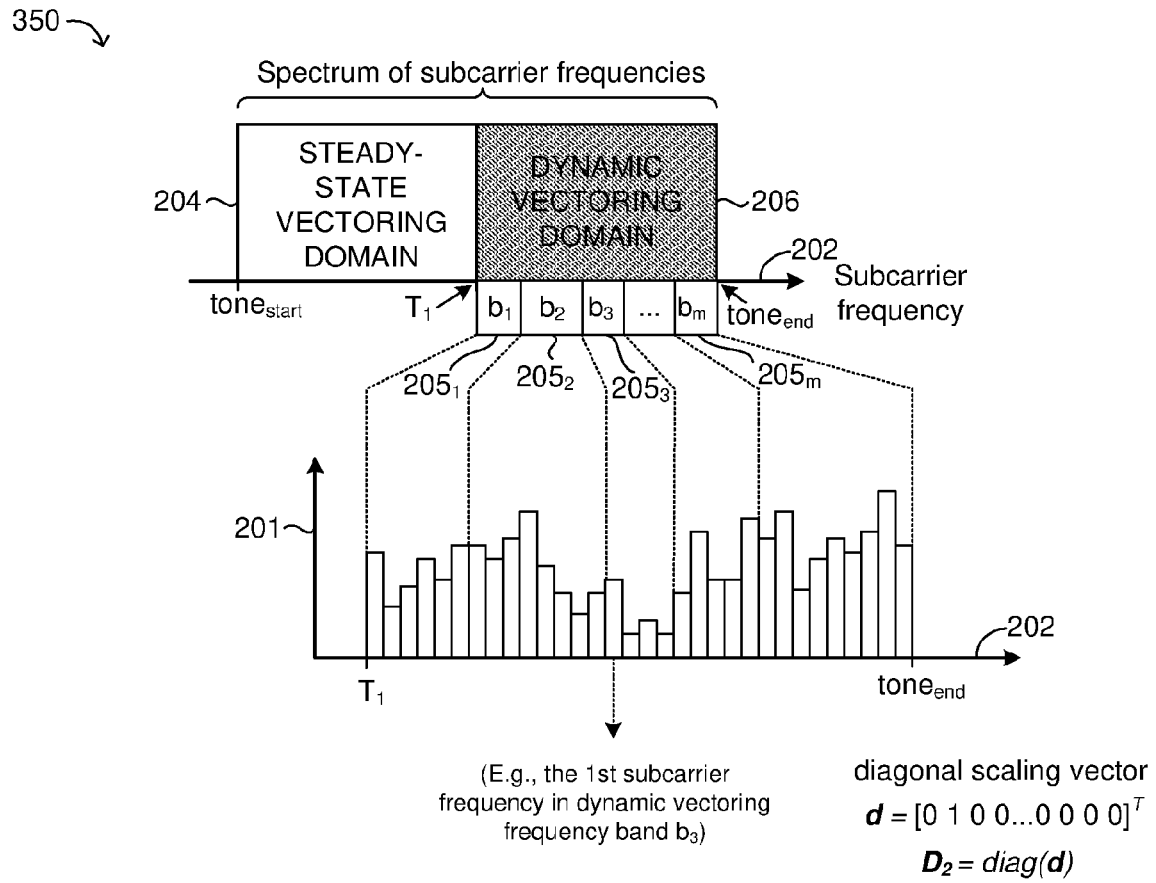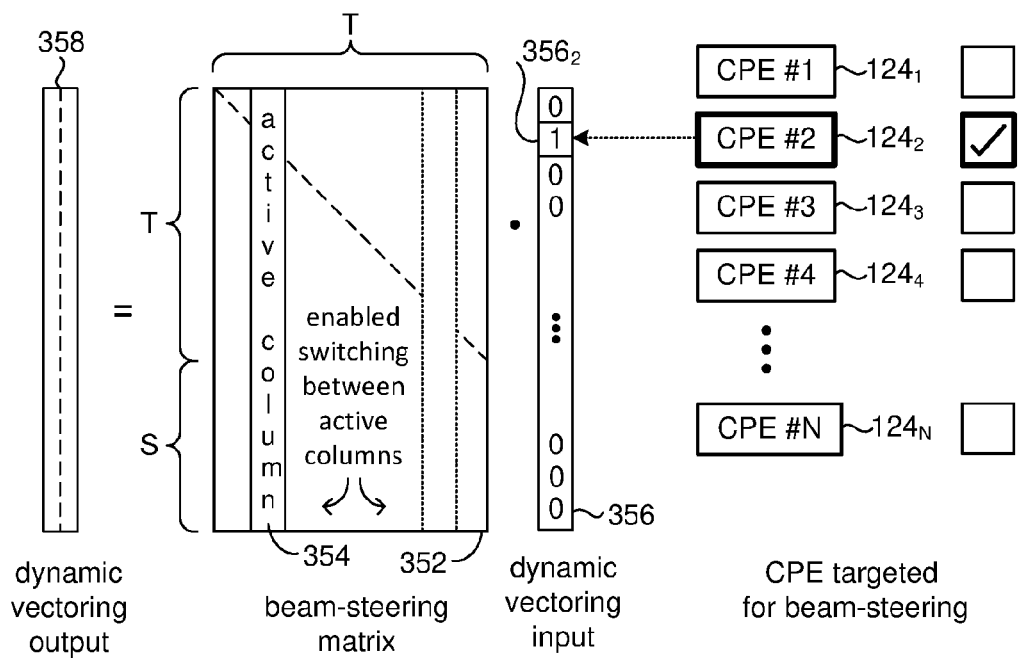
FIG. 9

DATA TRAFFIC-AWARE DYNAMIC VECTORING

CROSS REFERENCE TO RELATED APPLICATIONS

This application is a U.S. national stage entry of PCT/IL2019/051147, filed on Oct. 23, 2019, which claims priority to U.S. Provisional Application No. 62/749,137, filed Oct. 23, 2018, the contents of which are incorporated by reference.

FIELD OF THE DISCLOSED TECHNIQUE

The disclosed technique relates to electronic communications in general, and to systems and methods employing vectoring for minimizing or mitigating the effects of crosstalk, in particular.

BACKGROUND OF THE DISCLOSED TECHNIQUE

Wire-line technologies such as very-high speed digital subscriber line (VDSL) and G.fast (G series International Telecommunication Union (ITU)—T recommendation for fast access to subscriber terminals) are designed to convey signals for data communication over twisted-pair wires, for enabling to address multiple deployment scenarios such as fiber-to-the-distribution-point (FTTdp), fiber-to-the-cabinet (FTTcab), basement installation, and the like. For example, in FTTdp deployments, a distribution point unit (DPU) is connected with a plurality of customer premises equipment (CPE) units in a point-to-point topology. Without appropriate mitigation techniques, crosstalk (also denoted herein as "cross-talk") is a major concern in typical twisted-pair wires. Near-end crosstalk (NEXT) is typically avoided in G.fast by using synchronized time division duplex (TDD) frames such that the same downstream (DS) and upstream (US) division is used for all communication lines connecting the DPU and CPE units. Self-far-end crosstalk self-(FEXT) or simply "FEXT" is mitigated by employing vectoring on these lines to eliminate crosstalk.

Originally, G.fast, as with many TDD systems, was designed such that the TDD division between DS data traffic and US data traffic was fixed. As the technology evolved, and user's data traffic bandwidth requirements increased, there was a need to dynamically change this division based on changing traffic requirements. This capability to dynamically change the TDD division between DS and US data transmission was specified by the ITU-T for G.fast technology. This capability is called "coordinated dynamic time assignment" (cDTA).

Vectoring is used to mitigate FEXT in a vectoring group of CPE units connected to the DPU via respective communication lines. Precoding is used in the DS direction and FEXT cancelling is used in the US direction. A vectoring control entity (VCE) is responsible for calculating vectoring coefficients for both DS and US directions. To facilitate this calculation, channel information data is required together with configuration data indicating which of the DPU ports are active and which are inactive. Current prior art implementations use specific schemes (algorithms) to calculate the precoder coefficients in the DS direction. Examples for these schemes are zero forcing (linear) precoding, various optimizations thereof including beam forming, and various non-linear precoding schemes. In all such typical prior art implementations, the precoding scheme is selected once and then the precoder is updated from time to time to compensate for changes in the communication channel over time. Unlike TDD allocation, the process of calculating the precoder coefficients does not consider changing traffic requirements per user. The consequence of this is an inefficient use of hardware resources and low communication performance (bit-rate). Most of the time, the bitrate available per communication line is far from being fully utilized. When a specific CPE unit suddenly requires the exchange of a large amount of data, it is not able to make any use of hardware resources that are under-utilized by the other communication lines and corresponding CPE units within that vectoring group.

BRIEF DESCRIPTION OF THE DRAWINGS

The disclosed technique will be understood and appreciated more fully from the following detailed description taken in conjunction with the drawings in which:

FIG. 4 is a schematic diagram of additional functional aspects of the DRA controller, according to the disclosed technique;

FIG. 5A is a schematic diagram of a particular allocation of subcarrier frequencies within a spectrum of subcarrier frequencies, into a steady-state vectoring domain, and a dynamic vectoring domain, in accordance with the disclosed technique;

FIG. 5B is a schematic diagram of another particular allocation example of subcarrier frequencies within a spectrum of subcarrier frequencies, into a plurality of steady-state vectoring bands, and dynamic vectoring bands, in accordance with the disclosed technique;

FIG. 5C is a schematic diagram of a further particular allocation example of subcarrier frequencies within a spectrum of subcarrier frequencies, into a plurality of steady-state vectoring bands, and a plurality of dynamic vectoring bands, in accordance with the disclosed technique;

FIG. 9 is a schematic diagram of a dynamic vectoring domain scheme, constructed and operative in accordance with the disclosed technique;

SUMMARY OF THE PRESENT DISCLOSED TECHNIQUE

Figure 1:
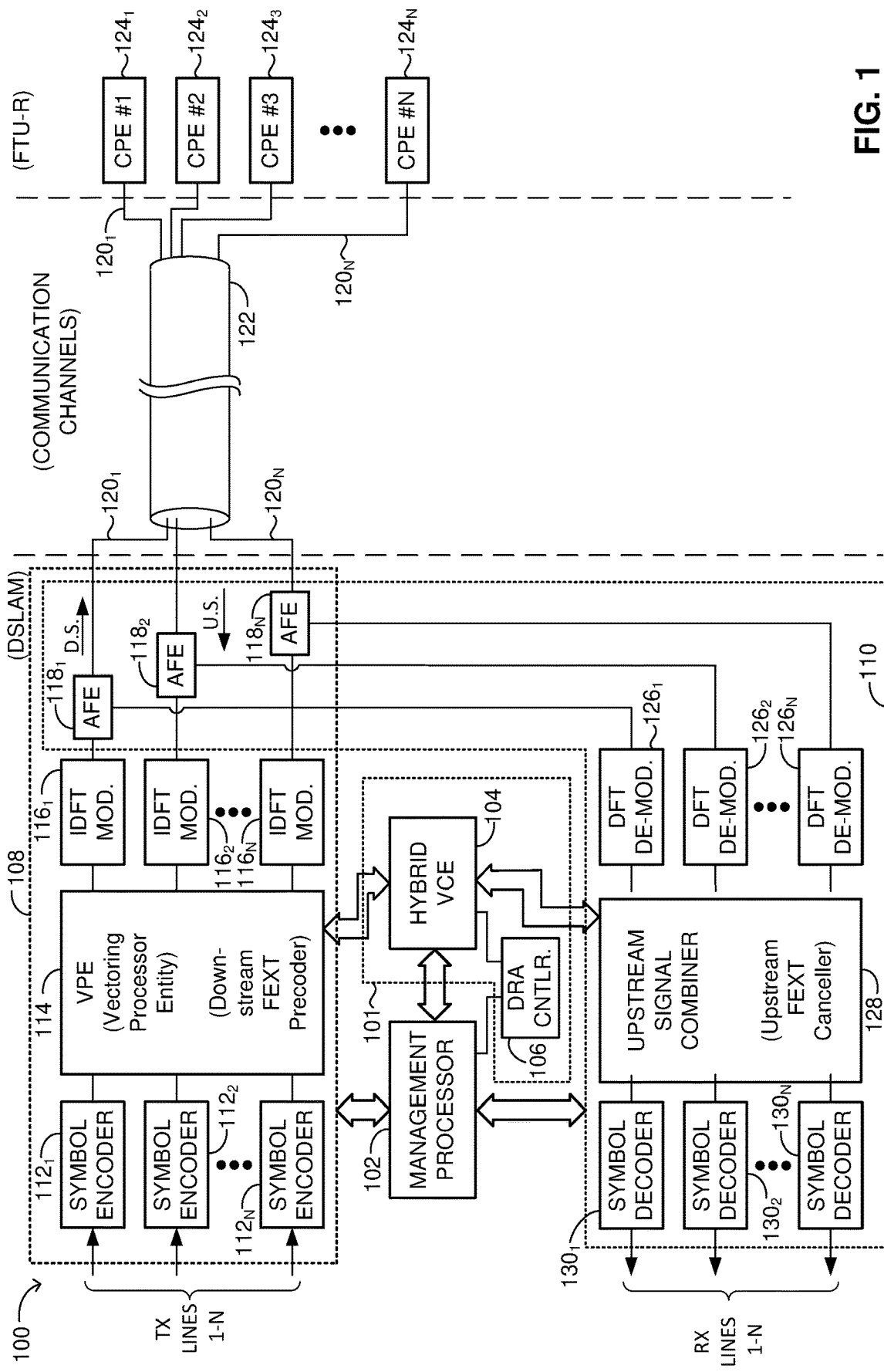
FIG. 1 is a schematic block diagram illustrating a simplified overview of a communication system, embodying the disclosed technique, constructed and operative in accordance with an embodiment of the disclosed technique.

It is an object of the disclosed technique to provide a method and a system employing traffic-aware vectoring (i.e., vectoring that takes data traffic into consideration) for transceiving (i.e., transmitting and receiving) data between a network side entity (i.e., defining a network side) and at least two nodes (i.e., defining a subscriber side), via a multiple-input multiple-output (MIMO) communication channel, over a plurality of subcarrier frequencies. Vectoring generally relates to techniques that involve reduction or mitigation of crosstalk levels in communication channels (wire-line or wireless) for the objective of improving performance (e.g., bitrate). The method and system of the disclosed technique apply to both a downstream (DS) direction, which is defined as data communication (i.e., data traffic flow) from the network side toward the subscriber side, as well as an upstream (US) direction, which is defined as data communication from the subscriber side toward the network side. The system and method of the disclosed technique are implemented differently with respect to the DS and US directions, as detailed hereinbelow.

According to one aspect of the disclosed technique, the method implemented in the DS direction includes determining an allocation that allocates each of the subcarrier frequencies for precoding with either one of a steady-state precoder, and at least one dynamic precoder. The method further includes monitoring DS data traffic from the network side entity toward the at least two nodes, and constructing the at least one dynamic precoder to optimize a bit-rate of the DS data traffic, according to the monitoring, and the allocation. The at least one dynamic precoder is configured to change with varying data traffic conditions (i.e., hence the term "traffic-aware vectoring", in general and "traffic-aware precoding" in particular for the DS direction).

The method implemented in the US direction includes determining an allocation that allocates each of the subcarrier frequencies for performing signal combining with either one of a steady-state signal combiner, and at least one dynamic signal combiner, where signal combining enables far-end crosstalk (FEXT) cancellation. The method further includes monitoring upstream (US) data traffic from the at least two nodes toward the network side entity, and constructing the at least one dynamic signal combiner to optimize a bit-rate of the US data traffic, according to the monitoring, and allocation. The at least one dynamic signal combiner is configured to change with varying data traffic conditions.

It is a further object of the disclosed technique to provide a system employing traffic-aware precoding for transceiving data between a network side entity that defines a network side, and at least two nodes defining a subscriber side, via a multiple-input multiple-output (MIMO) communication channel, over a plurality of subcarrier frequencies. The system implemented in both DS and US directions includes a dynamic resource allocation (DRA) controller, and a hybrid vectoring control entity (VCE).

Specifically, in the DS direction, the DRA controller is configured to monitor DS data traffic from the network side entity toward the at least two nodes, and to generate corresponding control parameters. The DRA controller is further configured to determine an allocation that allocates each of the subcarrier frequencies for precoding with either one of a steady-state precoder, and at least one dynamic precoder. The hybrid vectoring control entity (VCE) is configured to construct the at least one dynamic precoder for optimizing a bit-rate of the DS data traffic, according to monitored downstream data traffic, and the according to the allocation. The at least one dynamic precoder is configured to change with varying data traffic conditions according to the control parameters.

Specifically, in the US direction, the DRA is configured to monitor data traffic in the US direction from at least two nodes toward the network side entity, and to generate corresponding control parameters. The DRA controller is configured to determine an allocation that allocates each of the subcarrier frequencies for performing signal combining with either one of a steady-state signal combiner, and at least one dynamic signal combiner. The hybrid vectoring control entity (VCE) is configured to construct the at least one dynamic signal combiner for optimizing a bit-rate of the US data traffic, according to monitored US data traffic, and the allocation, wherein signal combining enables far-end crosstalk (FEXT) cancellation. The dynamic signal combiner is configured to change with varying data traffic conditions according to the control parameters.

DETAILED DESCRIPTION OF PREFERRED EMBODIMENTS

It is an object of the disclosed technique to provide a method and a system employing traffic-aware vectoring (i.e., vectoring that can vary according to data traffic) for transceiving (i.e., transmitting and receiving) data between a network side entity (i.e., defining a network side or "provider side") and at least two nodes (i.e., defining a subscriber side or "user side"), via a multiple-input multiple-output (MIMO) communication channel, over a plurality of subcarrier frequencies in a digital subscription line (DSL) MIMO transceiver network (i.e., in a wire-line implementation of the disclosed technique) or a wireless network. The following description relates to a wire-line implementation as an example, as the general principles likewise apply to wireless implementations. The DSL MIMO transceiver network enables a network side entity (e.g., a distribution point unit (DPU)) at the network side to be communicatively coupled (via a plurality of ports) to a plurality of nodes at the subscriber side (e.g., customer equipment entities (e.g., CPE units, user equipment (UE))) via a plurality of respective communication lines or links over a plurality of subcarrier frequencies. These communication lines, which are essentially twisted-pairs bundled together in a binder (i.e., in the wire-line implementation) are subject to far-end crosstalk (FEXT) that adversely affects communication performance, such as signal-to-noise ratio (SNR) and its resulting bitrate (also denoted interchangeably herein by "bit-rate"). Vectoring generally relates to techniques that involve reduction or mitigation of FEXT levels in communication lines for the objective of improving performance (e.g., bitrate). The method and system of the disclosed technique apply to both a downstream (DS) direction, which is defined as data communication (i.e., data traffic flow) from the network side toward the subscriber side, as well as an upstream (US) direction, which is defined as data communication from the subscriber side toward the network side. The system and method of the disclosed technique are implemented differently with respect to the DS and US directions, as detailed hereinbelow.

The Detailed Description refers to the "DPU unit" as an entity situated at the network side, although, this is just one example for a network-side entity (device) that may be installed at places other than the a distribution point (DP), for example, communication cabinets, multi-dwelling unit (MDU) (e.g., basements, service equipment rooms, etc.). Without loss of generality, the disclosed technique is described predominantly in the context of wire-line communications between the network side and the subscriber side; however, the principles of the disclosed technique likewise apply to wireless implementations, which include wireless links instead of wire-line communication lines and wireless transceiving capable hardware (e.g., antennas, radio frequency (RF) signal amplifiers, etc.).

According to one aspect of the disclosed technique, the method implemented in the DS direction includes determining an allocation that allocates each of the subcarrier frequencies for precoding with either one of a steady-state precoder, and at least one dynamic precoder. The method further includes monitoring DS data traffic from the network side entity toward the at least two nodes (subscriber side), and constructing the at least one dynamic precoder to optimize a bit-rate of the DS data traffic, according to the monitoring, and the allocation. The at least one dynamic precoder is configured to change with varying data traffic conditions (i.e., hence the term "traffic-aware vectoring", in general and "traffic-aware precoding" in the DS direction, and "traffic-aware signal combining" in the US direction, in particular).

The method implemented in the US direction includes determining an allocation that allocates each of the subcarrier frequencies for performing signal combining with either one of a steady-state signal combiner, and at least one dynamic signal combiner, where signal combining enables far-end crosstalk (FEXT) cancellation. The method further includes monitoring of upstream (US) data traffic from the at least two nodes toward the network side entity, and constructing the at least one dynamic signal combiner to optimize a bit-rate of the US data traffic, according to the monitoring, and the allocation. The at least one dynamic signal combiner is configured to change with varying data traffic conditions.

It is a further object of the disclosed technique to provide a system employing traffic-aware precoding for transceiving data between a network side entity that defines a network side, and at least two nodes that define a subscriber side, via a multiple-input multiple-output (MIMO) communication channel, over a plurality of subcarrier frequencies. The system implemented in both DS and US directions includes a dynamic resource allocation (DRA) controller, and a hybrid vectoring control entity (VCE).

Specifically, in the DS direction, the DRA controller is configured to monitor DS data traffic from the network side entity toward the at least two nodes, and to generate corresponding control parameters. The DRA controller is further configured to determine an allocation that allocates each of the subcarrier frequencies for precoding with either one of a steady-state precoder, and at least one dynamic precoder. The hybrid vectoring control entity (VCE) is configured to construct the at least one dynamic precoder for optimizing a bit-rate of the DS data traffic, according to monitored downstream data traffic, and according to the allocation. The at least one dynamic precoder is configured to change with varying data traffic conditions according to the control parameters.

Specifically, in the US direction, the DRA controller is configured to monitor data traffic in the US direction from the at least two nodes toward the network side entity, and to generate corresponding control parameters. The DRA controller is further configured to determine an allocation that allocates each of the subcarrier frequencies for performing signal combining with either one of a steady-state signal combiner, and at least one dynamic signal combiner. The hybrid vectoring control entity (VCE) is configured to construct the at least one dynamic signal combiner for optimizing a bit-rate of the US data traffic, according to monitored US data traffic, and the allocation, wherein signal combining enables far-end crosstalk (FEXT) cancellation. The dynamic signal combiner is configured to change with varying data traffic conditions according to the control parameters. Dynamic vectoring (i.e., dynamic precoding in DS direction, and dynamic signal combining in the US direction) depends on real-time varying data traffic conditions, and steady-state vectoring (i.e., steady-state precoding in the DS direction, and steady-state signal combining in the US direction) does not depend on real-time varying data traffic conditions. Both dynamic vectoring and steady-state vectoring require updates (modifications) from time to time so as to compensate for or adapt to changes in the communication channel over time (e.g., FEXT). A detailed description of the disclosed technique follows. Reference is now made to FIG. 1, which is a schematic block diagram, illustrating a simplified overview of a communication system, generally referenced 100, embodying an essence of the disclosed technique, generally referenced 101, constructed and operative in accordance with an embodiment of the disclosed technique. FIG. 1 shows a schematic block diagram of system 100 compatible with G.fast (G series ITU-T recommendation for fast access to subscriber terminals), or a family of G.fast systems, for the distribution point (DP) network side, supporting precoding in the DS direction and FEXT cancellation in the US direction. The left side of a left vertical dashed line in FIG. 1 represents a DSLAM (digital subscriber line access multiplexer) side, also denoted interchangeably herein as "network side", "DP side", "DP network side", "network side entity side", "distribution point" (DP), and "distribution point unit (DPU)". The middle portion in FIG. 1 (i.e., in between left and right vertical dashed lines) there is a plurality of communication channels $120_1$, $120_2$, $120_3$, ..., $120_N$ (also denoted interchangeably herein as "MIMO channel", "communication links", "communication lines") represented collectively by a binder 122 that contains and enfolds twisted-wire electrical conductor pairs (not shown), and which connects the network side to the subscriber side including a plurality of discrete customer premises equipment (CPE) units $124_1$, $124_2$, $124_3$, ..., $124_N$ (shown on the right of the right vertical line). "N" is a positive integer representing the total number of supported communication channels between the network side and the subscriber side. The CPE side, also denoted interchangeably herein as "CPEs", "subscriber side", "CPE units", "FTU-R" (G.fast transceiver unit—remote terminal (site)) includes a plurality of N CPE units, which are independent transceivers enabled for data communication with the DSLAM on the network side.

Communication system 100 includes the essence of the disclosed technique (i.e., its hardware symbolically represented by block 101), which is mainly embodied by a hybrid vectoring control entity (VCE) 104 (also termed interchangeably herein "vectoring control processor"), and a dynamic resource allocation (DRA) controller 106, all having the ability and configured to be in communication with each other, as will be described in greater detail hereinbelow. Communication system 100 further includes a management processor 102 configured for communication with hybrid VCE 104, as well as with DRA controller 106. DSLAM further includes a DS transceiver block 108 having a plurality of subcomponents (delineated by a dotted line), as well as an US transceiver block 110 having a plurality of subcomponents (delineated by a dotted line), where some subcomponents are shared, as particularized in greater detail hereinbelow. According to an integrated implementation (not shown), management processor 102, hybrid VCE 104 and DRA controller 106 are integrated into a single processing device (not shown). Alternatively, other implementations are viable, where at least two, or part of at least two, of management processor 102, hybrid VCE 104 and DRA controller 106 are integrated into a single processing device (not shown).

A general overview description of FIG. 1 will be followed by a more detailed description of the disclosed technique. The disclosed technique is applicable to the DS and US directions. Arbitrarily starting from the downstream (DS) direction, DSLAM (whose components are only partly shown) receives a data stream (bit stream—not shown) typically from a broadband remote access server (BRAS) (not shown) via other interface and framing blocks (not shown) to N symbol encoders $112_1, 112_2, \ldots, 112_N$, for each of N transmission (TX) lines 1 through N. Symbol encoders $112_1, 112_2, \ldots, 112_N$ are configured and operative to parse the incoming bit stream into groups designated to modulate different subcarrier frequencies of a discrete multi-tone (DMT) signal (not shown) (symbols). DRA controller 106 is generally configured to monitor DS data traffic from the network side toward the subscriber side, and to generate corresponding DS control parameters. Based on monitored DS data traffic (also taking into account different service level agreement (SLA) requirements of different users), DRA controller 106 is further configured to determine an allocation that allocates each of the subcarrier frequencies for precoding with either one of a steady-state precoder, and at least one dynamic precoder (as will be explained in greater detail hereinbelow). In determining the allocation, DRA controller 106 uses information provided from hybrid VCE 104 with respect to data carrying capacity (potential bit-rate) per communication line and per subcarrier frequency for the steady-state precoder, as well as for the at least one dynamic precoder. DRA controller 106 provides (i.e., communicates information pertaining to) the allocation to hybrid VCE 104 and to management processor 102. Management processor 102 is coupled with DS transceiver block 108 (i.e., technically coupled with subcomponents thereof). Management processor 102 is generally configured for configuring DS transceiver block 108 with the allocation as determined by DRA controller 106. Management processor 102 reconfigures system 100 for the allocation (and allocation updates) including updated bit-loading tables and gain tables. Management processor 102 is configured for additional functions that will be elaborated hereinbelow. Hybrid VCE 104 is generally configured to construct the at least one dynamic precoder according to the monitored DS data traffic, and the allocation. Hybrid VCE 104 is further configured and operative to calculate vectoring coefficients for the steady-state precoder as well as for the at least one dynamic precoder in the DS direction (at least partially based on the determined allocation), and to provide (e.g., load, input) these vectoring coefficients to a down-stream FEXT precoder 114 also termed interchangeably herein as "vectoring processor entity" (VPE), and "vectoring processor" that is coupled with hybrid VCE 104. VPE 114 is further coupled with symbol encoders $112_1, 112_2, \ldots, 112_N$, and with IDFT (inverse discrete Fourier transform) modulators $116_1, 116_2, \ldots, 116_N$. Down-stream FEXT precoder 114 is configured and operative to receive the at least one dynamic precoder (calculated precoding coefficients) from hybrid VCE 104, and individual outputted encoded symbols from each of symbol encoders $112_1, 112_2, \ldots, 112_N$ and to precode them (i.e., implement the precoding, i.e., the constellation points of a transmitted symbol per subcarrier frequency) using precoding coefficients supplied by hybrid VCE 104. The dynamic precoder is generally configured to change with varying data traffic conditions according to the DS control parameters from DRA controller 106. IDFT modulators $116_1, 116_2, \ldots, 116_N$ are each configured to receive the precoded symbols per communication line from VPE 114 and to modulate (i.e., in the frequency domain) complex values of precoded symbols onto DMT subcarrier frequencies (i.e., represented in the time domain). Each of IDFT modulators $116_1, 116_2, \ldots, 116_N$ are respectively coupled with analog front end (AFE) units $118_1, 118_2, \ldots, 118_N$ (i.e., for communication line 1, IDFT modulator $116_1$ is coupled with AFE $118_1$, for communication line 2, IDFT modulator $116_2$ is coupled with AFE $118_2$, and so forth to N). AFE units $118_1, 118_2, \ldots, 118_N$ are configured and operative to receive and to convert the modulated precoded symbols from their respective IDFT modulators from digital form to analog form enabling their transmission via respective communication lines over to the subscriber side. Each AFE unit is communicatively coupled with a respective CPE unit at the subscriber side via a specific communication line. Effectively, each of AFE units $118_1, 118_2, \ldots, 118_N$ constitutes a port of the DPU that is connected to its respective (index-wise) CPE unit $124_1, 124_2, \ldots 124_N$ at the subscriber side. Specifically, AFE $118_1$ is coupled with CPE unit $124_1$ via communication line $120_1$, AFE $118_2$ is coupled with CPE $124_2$ via communication line $120_2$, and likewise through to N where AFE $118_N$ is coupled with CPE unit $124_N$ via communication line $120_N$, as shown in FIG. 1. The shared subcomponents between DS transceiver block 108 and US transceiver block 110 are AFE units $118_1, 118_2, \ldots, 118_N$, which are enabled for bidirectional data traffic flows between network side toward subscriber side, and vice-versa.

In the upstream (US) direction, each of CPE units $124_1, 124_2, \ldots, 124_N$ is configured and operative to transmit signals, via its respective communication line $120_1, 120_2, \ldots, 120_N$ toward the network side where the respective AFE units receive these signals and convert them into digital form. Each of AFE units $118_1, 118_2, \ldots, 118_N$, are further respectively coupled with discrete Fourier transform (DFT) demodulators $126_1, 126_2, \ldots, 126_N$, which in turn demodulate the signals received from the AFE units. DRA controller 106 is generally operative to monitor data traffic in the US direction from the subscriber side toward the network side, and to generate corresponding US control parameters. Based on monitored US data traffic, DRA controller 106 is further configured to determine an allocation that allocates each of the subcarrier frequencies for signal combining with either one of a steady-state signal combiner, and at least one dynamic signal combiner. DRA controller 106 provides (i.e., communicates information pertaining to) the allocation to hybrid VCE 104 and to management processor 102. Hybrid VCE 104 is generally configured to construct the at least one dynamic signal combiner according to the monitored US data traffic, and the allocation. Hybrid VCE 104 is further configured to construct the at least one dynamic precoder according to the monitored US data traffic, and the allocation. Hybrid VCE 104 is further configured and operative to calculate at least one of combining and FEXT cancellation coefficients for the steady-state signal combiner as well as the at least one dynamic signal combiner in the US direction (at least partially based on the determined allocation), and to provide (e.g., load, input) these US vectoring coefficients to upstream signal combiner (i.e., also termed interchangeably herein as "upstream FEXT canceller" and "FEXT canceller")) 128 that is coupled with hybrid VCE 104. Management processor 102 is coupled with US transceiver block 108 (i.e., technically coupled with subcomponents thereof). Management processor 102 is generally configured for configuring US transceiver block 110 with the allocation as determined by DRA controller 106. Upstream signal combiner 128 (upstream FEXT canceller) is coupled with management processor 102, hybrid VCE 104, DFT demodulators $126_1, 126_2, \ldots, 126_N$ (as input) and symbol decoders $130_1, 130_2, \ldots, 130_N$ (as output). Upstream signal combiner 128 is configured and operative to receive and apply vectoring coefficients for dynamic signal combining (i.e., that includes FEXT cancelling) from hybrid VCE 104, as well as the demodulated signals from DFT demodulators $126_1, 126_2, \ldots, 126_N$ and further to cancel the effects of upstream FEXT by using canceller coefficients that hybrid VCE 104 provides. Dynamic signal combining changes with varying data traffic conditions according to the US control parameters from DRA controller 106. Symbol decoders $130_1, 130_2, \ldots, 130_N$ are configured and operative to receive the FEXT-cancelled demodulated signals (for each of N lines separately) and to decode these signals to extract the individual data frames. Management processor 102 is further configured to signal to hybrid VCE 104 the time at which the steady-state precoder and the at least one dynamic precoder take effect in the DS direction, as well as the steady-state signal combiner and the at least one dynamic signal combiner take effect in the US direction.

Figure 2:
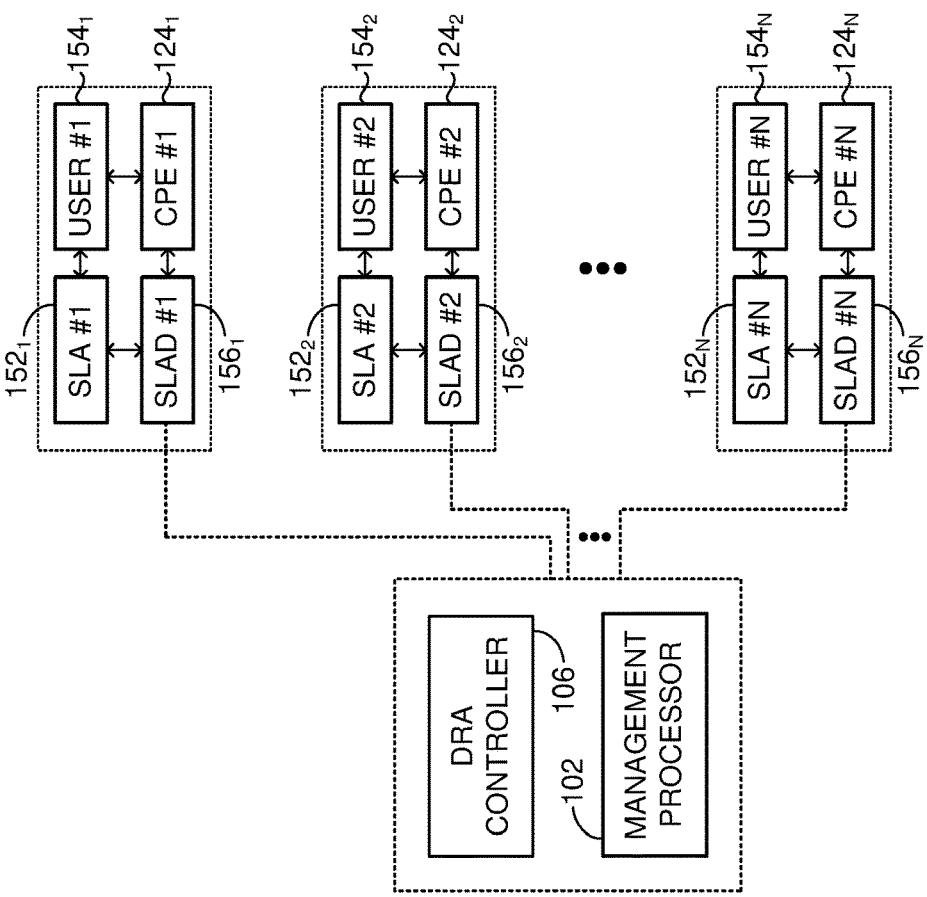
FIG. 2 is a schematic diagram illustrating exemplary relationships between a network side and a subscriber side with respect to service level agreement data (SLAD), in accordance with the disclosed technique.

Reference is now further made to FIG. 2, which is a schematic diagram illustrating exemplary relationships between a network side and a subscriber side with respect to service level agreement data (SLAD), in accordance with the disclosed technique. FIG. 2 illustrates part of the network side that includes management processor 102 and DRA controller 106, as well as the subscriber side that includes CPE units $124_1, 124_2, \ldots 124_N$. For each CPE unit $124_1, 124_2, \ldots 124_N$ there typically is associated a respective subscriber $154_1, 154_2, \ldots 154_N$, also denoted herein interchangeably as "end user", "service user" or simply "user" for short (e.g., a person, a group of people, a company, etc.) of a digital subscriber line (DSL) service. For each user $154_1, 154_2, \ldots 154_N$ there is associated a respective service-level agreement (herein denoted "SLA") $152_1, 152_2, \ldots 152_N$, each of which defines aspects of the service (i.e., in technical terms (e.g., a guaranteed (minimum) downstream bitrate, a guaranteed (minimum) upstream bitrate), legal term (e.g., responsibilities), etc.) that is agreed between the service provider and the service user. The service provider is obligated to provide service to the user in accordance with the service level detailed in the SLA. It is noted that the SLA may further include implied requirements for maintaining a quality-of-service (QoS) such as minimum bit-rate needed for supporting a high-quality video stream, etc. FIG. 2 illustrates that a service provider has a plurality of N SLAs with N respective users $154_1, 154_2, \ldots, 154_N$. Each user is associated with a respective communication line. For example, user #1 $154_1$ employs communication line $120_1$ (FIG. 1) having associated therewith SLA $152_1$ (FIG. 2), user #2 $154_2$ employs communication line $120_2$ having associated therewith SLA $152_2$, and so forth to N. Each SLA $152_1, 152_2, \ldots 152_N$ is at least partially defined by respective service-level agreement (technical) data SLAD $156_1, 156_2, \ldots 156_N$ that specifies the various technical parameter commitments by service provider to the user, such as downstream and upstream bitrates, throughput, and the like. FIG. 2 illustrates that SLA $152_1$ is associated with (and at least partly defined by) SLAD $156_1$, SLA $152_2$ is associated with (and at least partly defined by) SLAD $156_2$, and so forth to N.

Management processor 102 and DRA controller 106 are each configured and operative to receive at least a portion of SLADs $156_1, 156_2, \ldots 156_N$ respectively associated with CPE units $124_1, 124_2, \ldots 124_N$. A memory device (not shown), which is configured to be in data communication (e.g., coupled) with management processor 102 and DRA controller 106, is configured and operative to store SLADs $156_1, 156_2, \ldots 156_N$. Alternatively, management processor 102 and DRA controller 106 include internal memory (not shown) therein configured to store SLADs $156_1, 156_2, \ldots 156_N$. SLAs and their corresponding SLADs may include different forms of information, examples of which include: a bitrate per communication line (corresponding to CPE unit associated with a specific user), or different bitrate per communication line, a percentage of the bitrate of a single line bound, a percentage based on a particular precoding scheme (linear, non-linear, etc.), a lower-limit for bitrate in the DS and US direction, as well as other quality-of-service (QoS) data communication performance measures (e.g., latency, throughput, error rate, etc.).

Figure 3:
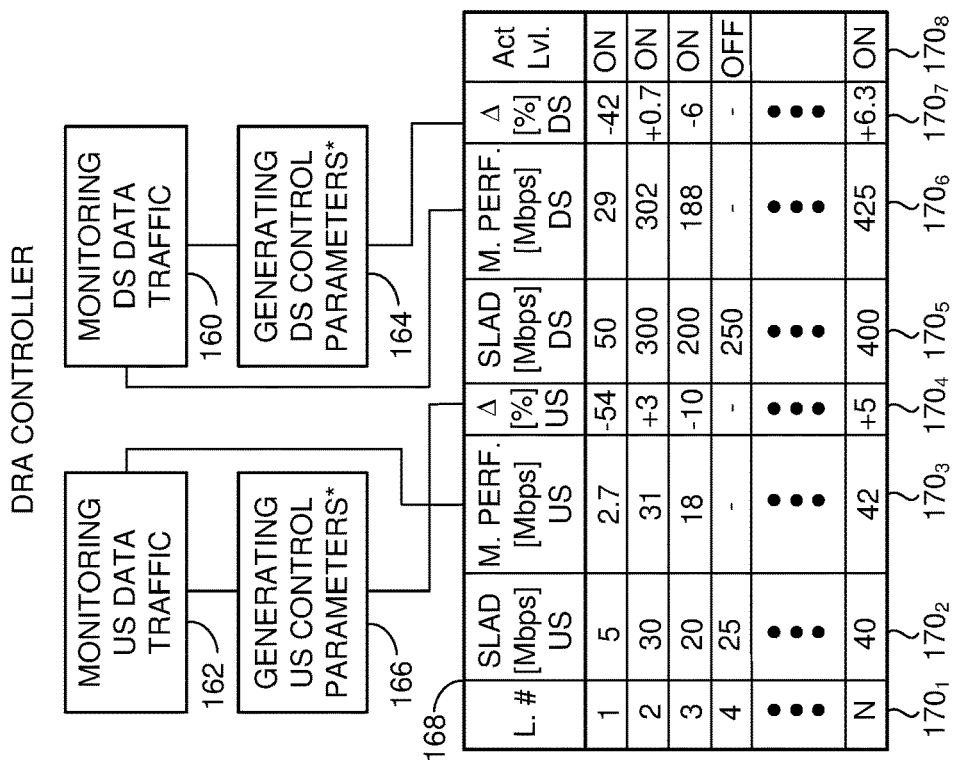
FIG. 3 is a schematic diagram of functional aspects of a dynamic resource allocation (DRA) controller, according to the disclosed technique.

Reference is now further made to FIG. 3, which is a schematic diagram of functional aspects of a dynamic resource allocation (DRA) controller, according to the disclosed technique. FIG. 3 illustrates partial functional aspects of DRA controller 106, which includes, in the DS direction, monitoring DS data traffic 160, and generating corresponding DS control parameters 164. Analogously, for the US direction, partial functional aspects of DRA controller 106 include monitoring US data traffic 162, and generating corresponding US control parameters 166. A table 168 tablulates (as an illustrative example) various data parameters (represented by columns $170_2, 170_3, 170_4, 170_5, 170_6, 170_7,$ and $170_8$) with respect to each of the communication lines $120_1, 120_2, \ldots, 120_N$, and their associated respective CPE units $124_1, 124_2, \ldots, 124_N$ (collectively represented by column $170_1$, and each represented by a row). Data parameters in table 168 include US SLAD $170_2$ (i.e., SLAD in the US direction), DS SLAD $170_5$ (i.e., SLAD in the DS direction), monitored performance ("M.PERF.") in the US direction $170_3$, as well in the DS direction $170_6$, comparison data between SLAD, monitored performance denoted by "Δ" (in %) for US $170_4$ as well as for the DS $170_7$, as well as monitored activity level ("Act. Lvl."). Additional data parameters on which the allocation is based (not shown in table 168) include the currently allocated bitrate for DS and US directions, as well as crosstalk levels. The current (actual) bitrate is compared to the allocated (potentially available) bitrate so as to determine a data bitrate utilization capacity per communication line (i.e., per user). The bitrate utilization information together with SLAD is used for determining an allocation (e.g., new, updated allocation).

Comparison data $170_4$ constitutes part of US control parameters 166, and likewise comparison data $170_7$ constitutes part of DS control parameters 164.

DRA controller 106 is configured and operative to monitor DS data traffic 160 as well as US data traffic 162 for respectively generating DS control parameters 164 as well as US control parameters 166, which at least partially involves determining communication performance (i.e., measured, calculated, estimated) according to bitrate, throughput, signal-to-noise (SNR) ratio, other measures, and the like. For elucidating the particulars of the disclosed technique, without loss of generality, the bitrate is chosen as an example measure of communication performance. Once DRA controller 106 determines the communication performance for each communication line (i.e., respective CPE unit) (in the DS and US directions) it is configured and operative to compare between the SLAD associated with each of the communication lines (i.e., associated with the corresponding users), with their corresponding communication performance, thereby yielding comparison data, $\Delta$ (in the DS and US directions). DRA controller 106 is further configured and operative to monitor the activity levels $170_5$ (e.g., "ON", "OFF", bit-rate) of each of the CPE units $124_1$, $124_2$, ..., $124_N$ connected to their respective communication lines $120_2$, ..., $120_N$.

Table 168 illustrates a representative example for each of communication lines $120_1$, $120_2$, ..., $120_N$ (FIG. 1) (column $170_1$ in FIG. 3), which in turn corresponds (index wise) to each of the CPE units $124_1$, $124_2$, ..., $124_N$ (FIG. 1) there corresponds a respective US SLAD, DS SLAD, monitored communication performance for DS and for US, as well as comparison data ($\Delta$) in the US and DS directions. Comparison data (in each direction (US or DS)) is a relative comparison between SLAD and monitored performance for each communication line and corresponding CPE unit. For example, the first row (i.e., below the header row) in table 168 shows that US SLAD corresponds to communication line #1 $120_1$ (associated with CPE unit $124_1$) specifies a bit-rate of 5 Mbps, and the monitored performance is 2.7 Mbps, the difference of which is (i.e., the comparison data $\Delta$) is −54%. In the DS direction, the DS SLAD likewise for communication line #1 is 50 Mbps, and the monitored performance is 29 Mbps, the difference of which is (i.e., the comparison data $\Delta$) is −42%. DRA controller 106 is configured to directly monitor data traffic from the network side, as well as to indirectly monitor traffic-related data communicated to it from the subscriber side, e.g., US buffer "water-level" data. (Direct and indirect monitoring of data traffic is used to determine a data bitrate utilization value (e.g., a percentage) between a current bitrate and the allocated bitrate for each communication line.)

Reference is now further made to FIG. 4, which is a schematic diagram of additional functional aspects of the DRA controller, according to the disclosed technique. Based on monitored DS and US data traffic 160 and 162, respectively (FIG. 3), DRA controller 106 (FIGS. 1 and 2) is further configured and operative to determine a priority in optimization (prioritize), i.e., produce priority data 180 (FIG. 4) that specifies an order of priority of CPE units for which communication performance require enhancing or optimizing. Specifically, priority data 180 is exemplarily shown in FIG. 4 in the form of a table that lists for each communication line (column $170_1$) a corresponding priority number for optimizing communication performance (e.g. bitrate) in the DS direction (column $182_1$), and a corresponding priority number for optimizing communication performance in the US direction (column $182_2$) given that the total number of communication lines is N. In the particular example shown in FIG. 4, communication line #1 (corresponding to CPE #1 $124_1$) possesses the highest priority for required optimization of communication performance (e.g., bitrate) for both the DS and US directions, since comparison data $\Delta$ in table 168 (FIG. 3) indicates communication line #1 to have the highest relative deviation between SLAD and monitored performance for that user (i.e., $\Delta$=−42% for DS direction, and $\Delta$=−54% in the US direction). (Assuming that the monitored (actual) low bitrate is limited by a low allocated bitrate). The numerical example in table 180 further shows that communication line #N (corresponding to CPE #N $124_N$) possesses the lowest priority for required optimization of communication performance in the DS direction, and the second lowest priority for required optimization of communication performance in the US direction.

One aspect of the disclosed technique involves providing a level of communication performance (e.g., bitrate) that attains (at least the minimum) respective guaranteed levels for each user (and thus for all users) according to their respective SLAs, while maximizing the level of communication performance (e.g., bitrate) for specific users according to their data traffic requirements and SLAs. Without loss of generality, a typical measure of communication performance is the bitrate. The system and method of the disclosed technique facilitate in providing a guaranteed bitrate per user all the time. According to the disclosed technique, the frequency spectrum is split into two domains, where the first domain enables to achieve the guaranteed bitrate per communication line (per user), by employing steady-state vectoring (i.e., that is not traffic-aware), and the second domain enables to enhance (e.g., optimize, maximize) communication performance for specific users in accordance with their respective data traffic requirements by employing dynamic vectoring (i.e., traffic-aware vectoring).

Reference is now further made to FIG. 5A, which is a schematic diagram of a particular allocation of subcarrier frequencies within a spectrum of subcarrier frequencies, into a steady-state vectoring domain, and a dynamic vectoring domain, generally referenced 200, in accordance with the disclosed technique. FIG. 5A illustrates a subcarrier frequency axis 202 in which the lowest subcarrier frequency (also denoted herein interchangeably as "tone") begins at a "tone$_{start}$" position along subcarrier frequency axis 202, and the highest subcarrier frequency (tone) ends at a "tone$_{end}$" position along this axis. Along subcarrier frequency axis 202 there is a particular subcarrier frequency (tone), denoted interchangeably herein as "crossover subcarrier frequency" and "tone$_{domain-boundary}$" that separates a steady-state vectoring domain 204 (also denoted "domain 0") and a dynamic vectoring domain 206 (also denoted "domain 1"), as shown in FIG. 5A. Steady-state vectoring domain 204 is allocated within the spectrum of subcarrier frequencies and constructed so as to meet the (relatively) fixed SLA-constraints of all users (i.e., slowly-changing in comparison to fast-changing, real-time data traffic requirements). Dynamic vectoring domain 206 is allocated and constructed so as to meet time-varying (e.g., real-time) data traffic requirements of specific users. The two domains do not overlap (i.e., no subcarrier frequency is allocated to both domains (at the same time periods)). (The allocation may generally change from time-to-time.) FIG. 5A illustrates an example of the two domains being contiguous to each other such that they are continuous along subcarrier frequency axis 202 (i.e., there exists a subcarrier frequency k in the steady-state vectoring domain 204, such that either subcarrier k+1 or subcarrier k−1 is in dynamic vectoring domain 206). Alternatively, steady-state vectoring domain 204, and dynamic vectoring domain 206 are not contiguous to each other (not shown) such that they are discontinuous along subcarrier frequency axis 202. In case of contiguous domains, as shown in FIG. 5A, the "tone$_{domain\text{-}boundary}$" determines an upper limit subcarrier frequency in steady-state vectoring domain 204, or a lower limit subcarrier frequency in dynamic vectoring domain 206 (i.e., a crossover subcarrier frequency between the two domains). In the DS direction, steady-state vectoring domain 204 is referred to as a steady-state precoding domain, and dynamic vectoring domain 206 is referred to as a dynamic precoding domain. In the US direction, steady-state vectoring domain 204 is referred to as steady-state signal combining domain, and dynamic vectoring domain 206 is referred to as dynamic signal combining domain.

DRA controller 106 is configured and operative to determine an allocation that allocates each of the subcarrier frequencies for vectoring (i.e., precoding in the DS direction, and signal combining in the US) with either one of steady-state vectoring, and dynamic vectoring. In other words, DRA controller 106 allocates each subcarrier frequency to either steady-state vectoring domain 204, or dynamic vectoring domain 206. DRA controller 106 determines this allocation according to DS and US control parameters 164 and 166 (FIG. 3), including priority data 180 (FIG. 4). The allocation may be time-variable (i.e., for different time periods there may be different allocations). Steady-state vectoring domain 204 may include a plurality of steady-state vectoring (precoding in DS and signal combining in US) frequency bands that include at least one subcarrier frequency, where a collection of all subcarrier frequencies that are allocated to the steady-state precoder constitutes as steady-state precoder domain 204. Dynamic vectoring domain 206 may include a plurality of dynamic vectoring (precoding in DS and signal combining in US) frequency bands that include at least one subcarrier frequency, where a collection of all subcarrier frequencies that are allocated to dynamic vectoring constitute a steady-state precoder domain. The allocation of carriers per vectoring type may be different for DS and US directions. In a typical real-world example situation, the "low" frequencies may efficiently be used for steady-state vectoring due to their lower FEXT. At the "higher" frequencies (in relation to the "low" frequencies), FEXT may be higher, and thus traffic-aware dynamic vectoring is employed to significantly increase the available bitrate for specific designated communication lines (i.e., users), making use of the FEXT channels. In other words, according to the example, the steady-state precoding domain resides in a lower part of a spectrum of subcarrier frequencies, and the dynamic precoding domain resides in a higher part of the spectrum. FIG. 5A shows a particular simple example of such an allocation, in which the subcarrier frequencies along the spectrum are divided into two distinct and continuous intervals.

Alternatively, other types of allocations are viable according to the disclosed technique, as detailed in conjunction with FIGS. 5B and 5C. FIG. 5B is a schematic diagram of another particular allocation example of subcarrier frequencies within a spectrum of subcarrier frequencies, into a plurality of steady-state vectoring bands, and dynamic vectoring bands, in accordance with the disclosed technique. FIG. 5C is a schematic diagram of a further particular allocation example of subcarrier frequencies within a spectrum of subcarrier frequencies, into a plurality of steady-state vectoring bands, and a plurality of dynamic vectoring bands, in accordance with the disclosed technique. Each domain 204 and 206 (FIG. 5A) may generally include multiple non-overlapping frequency bands (also denoted interchangeably as "bands", or "islands"). FIG. 5B illustrates an example allocation of subcarrier frequencies within the spectrum of subcarrier frequencies in which steady-state vectoring domain 204 (FIG. 5A) is divided into a plurality of separate and distinct non-overlapping steady-state vectoring bands 212 having fixed (i.e., and equal) bandwidths, and dynamic vectoring domain 206 (FIG. 5A) is divided into a plurality of separate and distinct non-overlapping dynamic vectoring bands 214 also having fixed bandwidths, thereby forming a "zebra" or alternating pattern (i.e., in this particular example). The divisions or boundaries between steady-state vectoring bands 212 and dynamic vectoring bands 214 along subcarrier frequency axis 202 are termed tone$_{domain\text{-}boundaries}$, each of which possesses a particular value. In this particular example, the bandwidths of each of steady-state vectoring bands 212 are equal to the bandwidths of each of dynamic vectoring bands 214. The boundaries in general serve as adjustable degrees-of-freedom (DOF) for the purpose of satisfying the constraints imposed by the individual SLAs (i.e., meeting the guaranteed performance measure, such as bitrate for each user).

FIG. 5C illustrates another example allocation of subcarrier frequencies within the spectrum of subcarrier frequencies in which steady-state vectoring domain 204 (FIG. 5A) is divided into a plurality of separate and distinct non-overlapping steady-state vectoring bands 222 having varying bandwidths, and dynamic vectoring domain 206 (FIG. 5A) is divided into a plurality of separate and distinct non-overlapping dynamic vectoring bands 224 with varying bandwidths. Analogously to FIG. 5B, the divisions or boundaries between steady-state vectoring bands 222 and dynamic vectoring bands 224 along subcarrier frequency axis 202 are also termed tone$_{domain\text{-}boundaries}$, each of which possesses a particular value. In this particular example, the bandwidths of steady-state vectoring bands 222, as well as of dynamic vectoring bands 214 are varied. As will be detailed hereinbelow in conjunction with FIG. 9, the dynamic vectoring bands may be associated with multiple dynamic precoders, each of which is configured to optimize communication performance for a different end user. Alternative implementations may include steady-state vectoring bands and dynamic vectoring bands that are not contiguous to each other (i.e., there exists at least one subcarrier frequency between the two bands that is not allocated to either one of these bands) (not shown).

The determination of the allocation that allocates each of the subcarrier frequencies to either one of steady-state vectoring domain 204, and dynamic vectoring domain 206, typically involves the determination of at least one of: (1) a subcarrier frequency (tone) domain boundary (crossover subcarrier frequency) that separates between the two domains in case the domains are contiguous (i.e., adjacent to each other such that they are continuous along subcarrier frequency axis 202); (2) at least one of an upper limit subcarrier frequency and a lower limit subcarrier frequency for steady-state vectoring domain 204; and (3) at least one of a lower limit subcarrier frequency and a upper subcarrier frequency for dynamic vectoring domain 206. DRA controller 106 is configured and operative to determine the allocation, as well as to determine at least one of (1), (2), and (3). To further explicate the particulars of this aspect of the disclosed technique, reference is now further made to FIG. 6, which is a schematic diagram, generally referenced 230, illustrating an example of a determination of a crossover subcarrier frequency between the steady-state vectoring domain and the dynamic vectoring domain, according to the disclosed technique. This typical real-world example situation manifests in relatively high bitrates in the low subcarrier frequencies (tones) where there are relatively lower levels of crosstalk, and relatively low bitrates in the high subcarrier frequencies where there are relatively higher levels of crosstalk.

Figure 6:
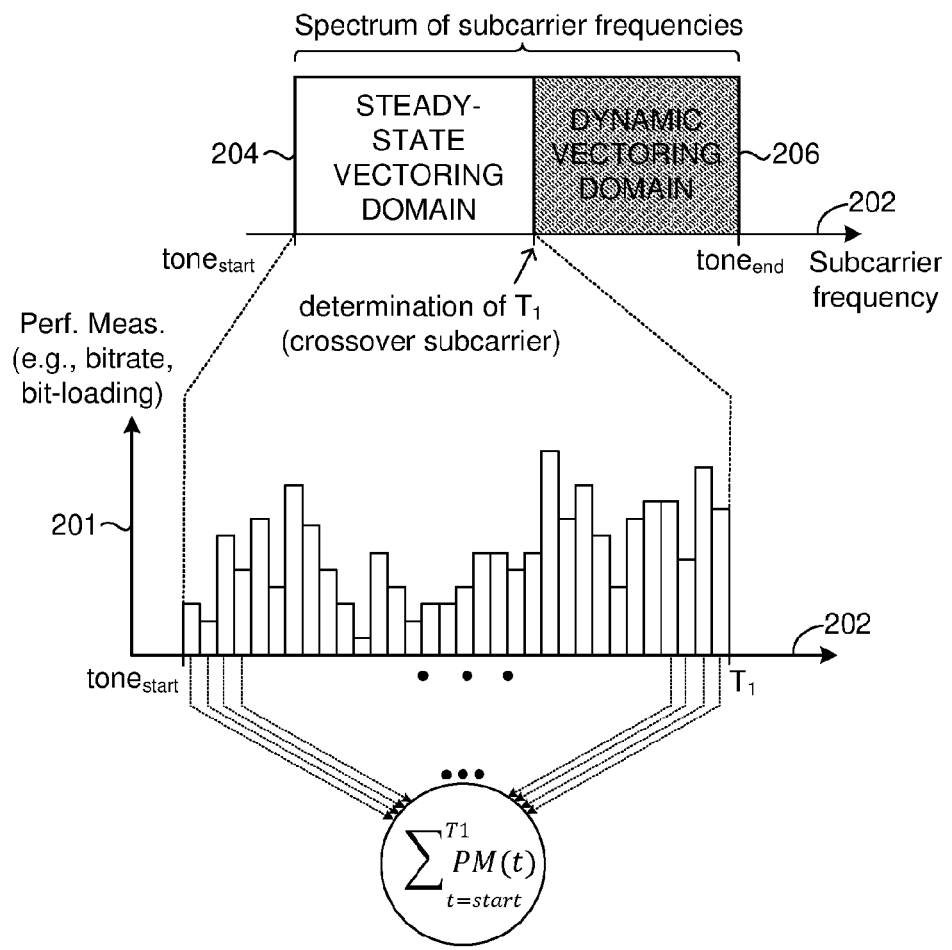
FIG. 6 is a schematic diagram illustrating an example of a determination of a crossover subcarrier frequency between the steady-state vectoring domain and the dynamic vectoring domain, according to the disclosed technique

FIG. 6 demonstrates a simple situation where the spectrum of subcarrier frequencies includes a steady-state vectoring domain 204, and a dynamic vectoring domain 206 that are contiguous to each other, along subcarrier frequency axis 202. FIG. 6 further shows a performance measure (e.g., bitrate, bit-loading) (along vertical axis 201) plotted versus subcarrier frequency (202) for steady-state vectoring domain 204, in which the vertical bars represent subcarrier frequencies (i.e., where their widths have been exaggerated for demonstration purposes). DRA controller 106 (FIGS. 1 and 2) is configured and operative to determine a crossover subcarrier frequency, also denoted "crossover tone" (denoted "$T_1$" in FIG. 6) by determining a performance measure (e.g., bitrate, and bit-loading) per tone according to control parameters (FIG. 3), summing the performance measure values per tone, so as to accumulate the values per communication line. Specifically, DRA controller 106 determines the minimum guaranteed quality-of-service (QoS) measure of data communication performance (e.g., bitrate). This measure may be common to all users or different per user (communication line) according to their respective SLA requirements (i.e., the operative constraint). A typical numerical example for a guaranteed bitrate may be 50 Mbps (mega-bits per second), common to all the lines, supporting multiple high-definition (HD) video streams per user. The crossover tone $T_1$ is selected to meet the minimum bitrate that meets this constraint. Implementation wise, DRA controller 106 runs an algorithm to determine the crossover tone. DRA controller 106 accumulates the rates per tone over the specific frequency band. The variable $T_1$ (determines the bandwidth) is increased until the SLA requirement per line is met. Specifically, the accumulated bitrate at the crossover tone is given by equation (1):

$$\text{Accum.\_Bitrate}(k@\text{tone}=T_1)=\Sigma_{t=start}^{T_1}\text{Bits}(k,\text{tone})*K$$

where K=$\Delta$f*FramingEfficiency (i.e., K is a conversion factor between bit-loading and bitrate), and $\Delta$f is related to the symbol rate in Hertz, e.g., $\Delta$f=51750 [Hz] and FramingEfficiency=(1−12/100). The minimum bitrate at the crossover tone is calculated and may be represented by equation (2):

$$\text{MinBitrate}(T)=\min_k\{\text{Bitrate}(k@\text{tone}=T)\},$$

under the constraint of finding the smallest valued tone, $T_1$ such that the minimum bitrate at that tone is greater or equal than the minimum target bitrate for each user:

$$\text{MinBitrate(tone=}T_1)\geq\min\{\text{TargetBitrate(per user)}\} \quad (3).$$

The crossover tone $T_1$ between the two domains effectively determines the minimum subcarrier frequency for which steady-state vectoring domain 204 is able to meet all SLA constraints for all users. Subcarrier frequencies that are higher than the crossover tone (i.e., tones>$T_1$) are allocated for dynamic vectoring domain 206.

Alternatively, DRA controller 106 is configured to determine the crossover tone by employing performance measures other than the bitrate, or bit-loading per subcarrier frequency, for example by calculating the mean (or average) bitrate for all subcarrier frequencies (i.e., "bundled performance measures"). Generally, at least one criterion for assessing collective communication performance (i.e., for all communication lines) may be constrained, such as minimum accumulated bitrate, minimum accumulated bit-loading, average bitrate, and the like.

Further alternatively, DRA controller 106 is configured to determine a plurality of crossover tones $T_2$, $T_3$, $T_4$, . . . for each tone domain boundary shown in FIGS. 5B and 5C for each steady-state vectoring band 212 (FIG. 5B) and band 222 (FIG. 5C) that respectively forms steady-state vectoring domain 204, given the constraint that the minimum common SLA-guaranteed bitrate of all users is collectively satisfied by the sum of bitrates of all individual steady-state vectoring bands that make up the entire steady-state vectoring domain. DRA controller 106 is configured to solve this multivariable constraint problem such as to yield the individual crossover tones $T_2$, $T_3$, $T_4$, . . . , or more generally the individual bandwidths values and frequencies of each of the steady-state vectoring bands.

Figure 7:
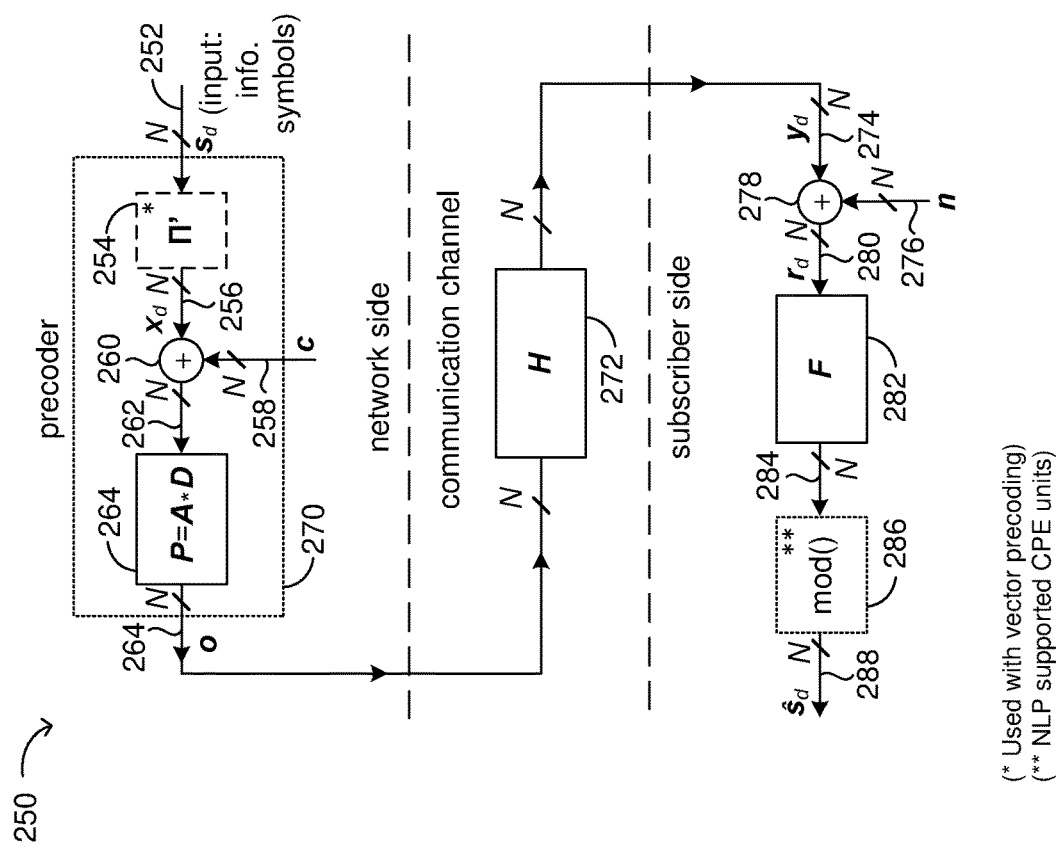
FIG. 7 is a schematic diagram of a general scheme for steady-state DS vectoring (precoding), constructed and operative in accordance with the disclosed technique.

Reference is now further made to FIG. 7, which is a schematic diagram of a general scheme for steady-state DS vectoring (precoding), generally referenced 250, constructed and operative in accordance with the disclosed technique. FIG. 7 shows an example of an "optimal" precoder in the sense that it is configured to maximize the average bitrate of system 100 in whole, according to a particular implementation of the disclosed technique. Such an implementation may use any type of precoding, such as linear precoding (LP), non-linear precoding (NLP), zero-forcing (ZF), beam-steering toward a target CPE unit, minimum-mean-squared-error (MMSE), etc. The type of precoder used to support the SLA-guaranteed service bitrate in the steady-state vectoring domain may also be optimized based on a maximum-minimum ("max-min") value.

The schematic diagram in FIG. 7 is split into three distinct sections of which there's a network side (upper section), a communication channel (middle section), and a subscriber side (lower section). Starting from the network side, information symbols 252, are inputted into an (optional) permutation block 254, which is configured and operative to permute information symbol elements in vector $s_d$ (subscript "d" indicates the DS direction), according to a permutation matrix $\Pi'$. The use of permutation block 254 is optional in the sense that it is used in the case vector precoding is employed by system 100. In case vector precoding is employed, each information symbol element in vector $s_d$ is associated with a particular CPE unit. The permutation takes into consideration the division of CPE units into two groups (i.e., those that employ LP and those that employ NLP). Permutation block 254 permutes between information symbol elements (e.g., arbitrarily or into two successive aggregate groups for LP and NLP, or alternatively other permutations). Permutation block 254 outputs a signal 256 (i.e., permuted information symbols), otherwise without permutation block 254, $s_d$=x. Signal 256 is added via an adder 260 with a perturbation vector 258, denoted by a vector c. In case vector precoding is used c≠0 (e.g., for NLP), otherwise c=0 for LP. The perturbation vector can be any addition that may be eliminated by modulo arithmetic operations at the subscriber side (by NLP supported CPE units). An output 262 from adding operation 260, x+c, constitutes as an input to a block 264 configured and operative to perform the pseudo-inversion operation: A=pinv(H) (non-normalized precoder) and calculate a normalized precoder P via the product P=A*D, where D is a diagonal matrix that can generally be represented by D=$D_1$ $D_2$, where $D_1$ denotes a matrix used for performing precoder power scaling and $D_2$ denotes a matrix used for performing output power normalization and scaling. Block 264 in conjunction with optional permutation block 254, adder 260 and a perturbation vector 258, c, collectively constitute a precoder 270, denoted by P, which in turn is configured and operative to perform pseudo-inversion of a communication channel matrix H, and to generate outputted signal 264 (represented by vector o), which propagates via a communication channel 272, the result of which is a signal 274 (represented by a vector $y_d$) received at the subscriber side. A received signal 280 at the receiver side (represented by a vector $r_d$) is the sum of signal 274 ($y_d$) with additive noise 276 (represented by a vector n), signifying that the precoded information symbols propagated through communication channel 272 includes additive 276 noise. Received signal 280 is inputted to a block 282 configured and operative to perform frequency equalization, i.e., scaling by inverting diagonal vector D, i.e., F=inv(D) given that A=pinv(H), the output of which is denoted by an output signal 284. For NLP supporting CPE units, output signal 284 represents an input to a modulo operation block 286 which is configured and operative to apply modulo arithmetic operation to received signal 284, and to output an output signal 288 of estimated symbols (represented by a vector $\hat{s}_d$). For those CPE units whose supportability does not include NLP (i.e., CPE units not supporting the decoding of NLP encoded data, e.g., don't have modulo arithmetic blocks) output signal 284 is effectively output signal 288 (i.e., no modulo operation is applied. In one implementation, precoder 270 is employed for all subcarrier frequencies in the spectrum of subcarrier frequencies (e.g., when there are no specific requirements for enhancing communication performance (bitrates) for designated users). In another implementation, precoder 270 is employed only for steady-state vectoring bands 212 (FIG. 5B) and 222 (FIG. 5C) in the spectrum of subcarrier frequencies.

Figure 8:
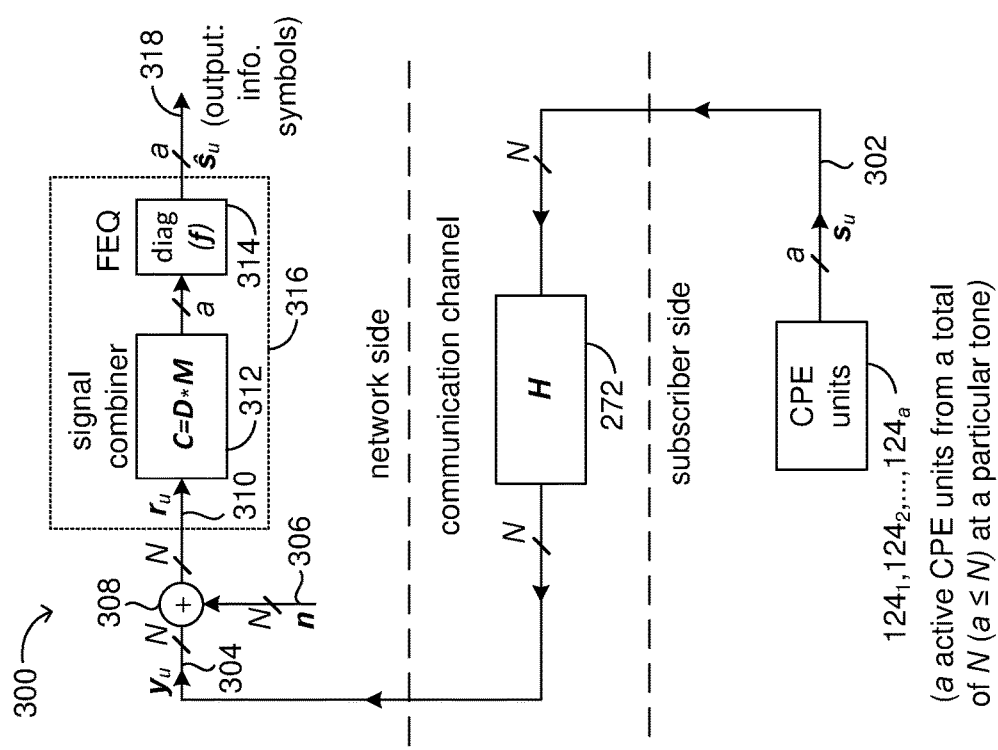
FIG. 8 is a schematic diagram of a general scheme for steady-state and dynamic US vectoring (signal combining), constructed and operative in accordance with the disclosed technique.

Reference is now made to FIG. 8, which is a schematic diagram of a general scheme for steady-state and dynamic US vectoring (signal combining), generally referenced 300, constructed and operative in accordance with the disclosed technique. FIG. 8 shows an example of signal combining (in the US direction), according to a particular implementation of the disclosed technique. Analogously to FIG. 7 in the DS direction, the schematic diagram in FIG. 8 for the US direction is divided into three distinct sections of which there's a network side (upper section), a communication channel (middle section), and a subscriber side (lower section). Starting from the subscriber side, information symbols 302 in vector $s_u$ (subscript "u" indicates the US direction) are outputted from a active CPE units $124_1$, $124_2$, . . . , $124_N$ (where a≤N) at a particular subcarrier frequency, where each information symbol element in vector $s_u$ is associated with a particular CPE unit. Outputted information signals 302 propagate via communication channel 272, the result of which is a signal 304 (represented by a vector $y_u$ (dim $y_u$=N×1)) received at the network side. A received signal 310 at the network side (represented by a vector $r_u$ (dim r=N×1)) is a sum of signal 304 ($y_u$) with additive noise 306 (represented by a vector n (dim n=N×1)), signifying that the received information symbols propagated through communication channel 272 includes additive 308 noise. Received signal 310 is inputted to a signal combiner block 312, which is configured and operative to perform signal combining via a canceller matrix C whose dimensions are a×L (i.e., dim C=a×N), which is calculated by matrix multiplication of matrix D (dim D=a×a) with matrix M (dim M=a×N), i.e., C=D*M, where D is a diagonal scaling matrix, and M is a linear estimator matrix. Signal combiner block 312 is configured to combine signals of N communication lines including the crosstalk exhibited in the inactive lines (N−a), so as to yield canceller matrix C. Signal combiner block 312 outputs a signal to frequency equalizer (FEQ) block 314, which in turn is configured and operative to determine a FEQ vector by calculating a diagonal of a gain scaling vector f (dim f=a×1). Gain scaling vector is defined as f=1./diag(D) (i.e., component-wise division of the diagonal of matrix D). FEQ block 314 is then configured and operative to output estimated information symbols 318 denoted by vector $\hat{s}_u$ (dim $\hat{s}_u$=a×1). Signal combiner block 312 and FEQ block 314 are part of the DPU. Examples for linear estimators (i.e., matrix M) according to the disclosed technique include:

1. A zero-forcing (ZF) estimator, given by:

$$M = \text{pinv}(H) = (H^H * H)^{-1} H^H \quad (5),$$

or a generalized pseudoinverse for an optimized matrix Z: $M = \text{pinv}(Z^H * H)^{-1} Z^H$, where dim Z=dim H;

2. A ZF Gauss-Markov estimator, given by:

$$M = (H^H * \text{Cov}_n^{-1} * H)^{-1} H^H \text{Cov}_n^{-1} \quad (6),$$

where $\text{Cov}_n$ is the noise covariance matrix: $\text{Cov}_n = \langle nn^H \rangle$ where the brackets denote averaging over (random) variable realizations;

3. A MMSE estimator, given by:

$$M = (C_{renorm} + H^H * \text{Cov}_n^{-1} * H)^{-1} H^H \text{Cov}_n^{-1} \quad (7),$$

where $C_{renorm}$ is a non-negative renormalization matrix, e.g., $C_{renorm} = \text{Cov}_s^{-1}$ and $\text{Cov}_s$, and $\text{Cov}_n$ are respectively the signal and noise covariance matrices: $\text{Cov}_s = \langle ss^H \rangle$ and $\text{Cov}_n = \langle nn^H \rangle$.

Hybrid VCE 104 is configured to perform gain adaptation after constructing of the at least one dynamic signal cancelling matrix. DRA controller 106 (FIGS. 1 and 2) is configured and operative to provide data pertaining to the allocation to hybrid VCE 104, which in turn is configured and operative to construct the at least one dynamic precoder in the DS direction and at least one dynamic signal combiner for the US direction for optimizing a data communication performance measure (e.g., bit-rate) of the DS and US data traffic, according to the allocation. The dynamic precoder is hereby described in greater detail.

Reference is now further made to FIG. 9, which is a schematic diagram of a dynamic vectoring domain scheme, generally referenced 350, constructed and operative in accordance with the disclosed technique. A top part of FIG. 9 illustrates steady-state vectoring domain 204, and dynamic vectoring domain 206, which are contiguous to each other and separated at crossover subcarrier frequency $T_1$, and both of which extend along subcarrier frequency axis 202 the lowest subcarrier frequency of which is tone$_{start}$ and the highest subcarrier frequency (tone) is tone$_{end}$. Dynamic vectoring domain 206 may include a plurality of dynamic vectoring frequency bands $205_1$ ($b_1$), $205_2$ ($b_2$), $205_3$ ($b_3$), . . . , $205_m$ ($b_m$) (where m is an arbitrary positive integer ≥2). A communication performance measure (e.g., bitrate, bit-loading) (vertical axis 201) is plotted versus subcarrier frequency (horizontal axis 202), in which the vertical bars (whose widths are exaggerated for clarity) represent a specific communication performance measure per subcarrier frequency in dynamic vectoring domain 206. Each dynamic vectoring frequency band includes at least one (typically a plurality of) subcarrier frequencies each represented by the vertical bars.

Construction of at least one dynamic precoder involves solving an optimization problem such to optimize (e.g., maximize) a communication performance measure such as bitrate of DS data traffic. Without loss of generality, the communication performance measure selected to explicate the construction particulars of the dynamic precoder is the bitrate, for which a bitrate vector per communication line i is defined as R(i). The optimization problem may be stated as max{R(i)} under the constraint that R(i)≥$R_{min}$ (i.e., maximizing the bitrate vector such that the bitrate for every i-th communication line is greater than or equal to a minimum bitrate, $R_{min}$). Satisfying the constraint (i.e., R(i)≥$R_{min}$) is achieved by steady-state vectoring domain 204 by meeting the SLA requirements of all users, as explained hereinabove in conjunction with FIG. 6. Implementation of the dynamic precoder may involve beamforming or beam-steering to optimize (e.g., maximize) performance of specific CPE units (respective users), and beam-steering to optimize (e.g., maximize) performance of specific CPE units for a specific CPE unit at a particular time. Beamforming generally relates to spatial filtering techniques for controlling the directionality (i.e., the direction and shape or form of a signal beam) in the transmission and/or reception of a signal beam by combining (e.g., adding, subtracting) or varying individual elements involved in the transmission and/or reception of the signal (e.g., phase and amplitude). Beam-steering generally relates to techniques for controlling (i.e., dynamically altering) a signal beam pattern by changing the phases (or relative phases) of the signals that operate those signal elements.

Hybrid VCE 104 is configured to enable attainment of the SLA-guaranteed bitrate for every user via steady-state vectoring domain 204 (i.e., not traffic-aware), and concurrently facilitate enhancement of at least one data communication performance measure such as bitrate via dynamic vectoring domain 206 for a specific target user in accordance with their respective current data traffic requirements (i.e., traffic-aware vectoring) at a specific time period. The terms "target user" and "target CPE unit" associated therewith are interchangeable". The target CPE unit can change from one time period to another. Alternatively, hybrid VCE 104 is configured to optimize DS data communication performance (e.g., DS bitrate) for a plurality of CPE units (i.e., users) by employing a plurality of dynamic precoders (for the DS direction) such that each dynamic precoder is associated with one dynamic vectoring frequency band $205_1$ ($b_1$), $205_2$ ($b_2$), $205_3$ ($b_3$), . . . , $205_m$. This implementation can be referred to as concurrent multiple dynamic precoding via frequency division. Similarly in the US direction, hybrid VCE 104 is configured to optimize US data communication performance (e.g., US bitrates) from the plurality of CPE units by employing a plurality of dynamic signal combiners (US direction) such that each dynamic signal combiner is associated with one dynamic vectoring frequency band $205_1$ ($b_1$), $205_2$ ($b_2$), $205_3$ ($b_3$), . . . , $205_m$. This implementation can be referred to as concurrent multiple dynamic signal combining via frequency division. Each of these DS and US implementations can alter between different time periods, as well as employ multiplexing techniques. For example, in the DS direction different number of dynamic precoders can be operative at different time periods and at different dynamic vectoring frequency bands. Alternative implementations include time-division duplexing (TDD) for dynamic vectoring DS and US directions (i.e., at different times), as well as frequency-division duplexing (FDD) for concurrent dynamic DS and US directions each at different dynamic vectoring frequency bands. According to a particular implementation, system 100 of the disclosed technique is configured to enable collective dynamic time assignment (cDTA), in which the US and DS ratios can be adjusted in time in accordance (i.e., in response to) dynamically varying traffic requirements. Specifically, hybrid VCE 104 functionally integrates cDTA with dynamic vectoring (i.e., precoding in the DS direction and signal combining in the US direction) so as to enable further improvement of data communication performance (e.g., bitrates), by adjusting DS-to-US (alternatively US-to-DS) time allocation ratios at specific time periods.

Hybrid VCE 104 employs beam-steering for providing a specific CPE unit (user) enhanced bitrate when such enhancement is required according to monitored and changing data traffic conditions. In its simplest case, the entire DPU's resources (i.e., ports whose end sections are implemented by AFE units $118_1$, $118_2$, . . . , $118_N$) are allotted for just one of CPE units $124_2$, $124_3$, $124_4$, . . . , $124_N$. To enhance the bitrate of a particular one of CPE units $124_1$, $124_2$, $124_3$, $124_4$, . . . , $124_N$, hybrid VCE 104 is configured to construct a beam-steering matrix (bottom part of FIG. 9) having a total of T ("Target" CPE unit) columns and T+S ("Target plus Supporting line") rows, where T+S=N the total number of communication lines (i.e., or the number of ports available for transmission). It is noted that there is a fixed number of communication lines corresponding to a fixed number of respective DPU ports, N in total, each of which is configured to be in communication with respective N CPE units, when applicable. That is, in certain cases and times the total number of CPE units might be less than N, such as in the case of fewer subscribers (users) than N at the subscriber side, likewise in the case when not all N CPE units are active at the same time. In the case of a active CPE units at a particular time when a<N, the remaining S supporting communication lines possess crosstalk couplings such that enable them to participate in beam-steering for the purpose of enhancing communication performance of an active particular target CPE unit. (This can be achieved for a particular S supporting communication line by multiplying a transmitted signal with the complex conjugate of the crosstalk coupling that exists in the particular S supporting line).

In the DS direction, hybrid VCE 104 is configured to determine precoder $P_{ik}$ required for beam-steering matrix 352, for example by equation (8):

$$P_{ik} = \frac{H_{ki}^*}{|H_{ki}|} \exp(j\phi_k)$$

where i=1, . . . , N (total communication lines); k=1, . . . , a (total active CPE units); (in general N≥a); $H^*_{ki}$ represents the complex conjugate of the communication channel matrix H; $|H_{ki}|$ is its respective normalization factor; and exp(jφk) is a scaling factor (optionally applied) to make an active diagonal of the precoder/beam-steering matrix 352 to be unit, where $\phi_k$=phase($H_{kk}$).

Hybrid VCE 104 determines the phase such that it matches the complex conjugate of the crosstalk's phase (i.e., so that the individual crosstalk contributions will cancel each other's phases, i.e., "cross-phase cancellation").

Beam-steering matrix 352 includes an active column 354 that is column-variable, for enabling the precoder to effectively be a "beam-steerer" towards a target CPE unit. FIG. 9 shows a particular example where CPE unit #2 $124_2$ is targeted for beam-steering (i.e., for the purpose of enhancing data communication performance for that CPE unit, i.e., the target CPE unit). To achieve beam-steering towards a target CPE unit, hybrid VCE 104 configures a dynamic vectoring input, represented by a column vector 356 in which the j-th row $356_j$ that corresponds to the j-th CPE unit (1≤j≤N) is set to a non-zero value, typically equal to 1 while the remaining columns are set to 0 ("zeroed"). In the example shown in FIG. 9, row $356_2$ corresponds to the $2^{nd}$ CPE unit $124_2$ targeted for beam-steering. Active column 354 is column-variable in the sense that it can be variably selected (or "switched") by zeroing all precoder inputs in dynamic vectoring input column vector 356 except for the j-th row $356_j$ corresponding to the j-th CPE unit that is targeted for optimization. Effectively, only one precoder input is active at a particular time and particular subcarrier frequency and the other inputs are zeroed. Hybrid VCE 104 calculates a product between beam-steering matrix 352 and dynamic vectoring input 356 vector, the result of which is a dynamic vectoring output 358 represented by a column vector.

Generally, optimization in the DS direction involves beam-steering toward a target CPE unit of T possible (active) CPE units, by using also supporting communication lines (if available) from a total of S supporting lines, selected from a total number of N communication lines between the network side and subscriber side, such that T+S=N. The target CPE unit is selected according to priority data 180 (FIG. 4). The dynamic precoder is represented by a corresponding precoder matrix having elements that are precoder coefficients, and whose dimensions are T columns times N rows, where each column is selected for a particular time period and is defined as an active column that is associated with optimization of the bit-rate for the respective target node. Dynamic selection involves conferring a non-zero gain value to an input of the dynamic precoder that corresponds to the target node, while conferring zero gain values corresponding to other CPE units that are not the target CPE unit.

Hybrid VCE 104 is configured and operative to switch between individual target CPE users intended for enhancing their respective data communication performance by effectively altering the dynamic vectoring input represented by column vector 356. There are N different column vectors 356 (not shown) corresponding to N users, i.e., CPE units $124_1, 124_2, 124_3, \ldots, 124_N$. Every column of beam-steering matrix 352 may be multiplied by optionally different column vectors. This design is very efficient as there is no need to recalculate "on the fly" a new beam-steering matrix for different target users, as there's only a requirement to change the binary diagonal loading which is used for the power scaling, $D_2$=diag(d), where d is a vector having all zero elements apart from one non-zero element (equal to 1), whose position (row) corresponds to a target user number (i.e., effectively operating as a switch for switching between individual target CPE units). Recall that $D=D_1*D_2$, is a diagonal matrix, where $D_1$ denotes a matrix used for performing precoder power scaling per communication line and $D_2$ denotes a matrix used for performing output power normalization and scaling. Dynamic vectoring input vector 356 is obtained from multiplication of matrix D with data to be precoded (e.g., from an encoder output that includes a stream of information symbols). Recall with respect to FIG. 7 that information symbols 252 denoted by vector $s_d$ are inputted into precoder 270. For beam-steering all elements of vector $s_d$ are zero except for one non-zero element corresponding to the target CPE unit. The non-zero element in vector $s_d$ can be denoted by $s(k)=S_g*\delta(k-g)$, where g is the "target" user and $S_g$ is its information symbol (at a particular subcarrier frequency). Hybrid VCE 104 is configured to perform gain adaptation after construction of the at least one dynamic precoding matrix.

In the US direction, hybrid VCE 104 is configured to determine signal combining coefficients $C_{ki}$ required for beam-steering in the US direction, for example by equation (9):

$$C_{ki} = \frac{\alpha_{ik} * H_{ik}^*}{|H_{ik}|}\exp(j\phi_k)$$

where i=1, ..., N (total communication lines); k=1, ..., a (total active CPE units); (in general N≥a); $\alpha_{ik}$ is a real weight coefficients matrix, $H^*_{ik}$ represents the complex conjugate of the communication channel matrix H; $|H_{ik}|$ is its respective normalization factor; and $\exp(j\phi_k)$ is a phase shift parameter, with a phase $\phi_k$. This describes one possible implementation of the signal combiner in the case where only one CPE unit is transmitting at any given time can be based on receive-path beam-steering. Weighing (i.e., attributing corresponding weight coefficients to signals) may be used to normalize any differences in SNR between the input communication lines (to DPU ports).

Generally, optimization in the US direction involves beam-steering by signal combining (enabling FEXT cancellation) toward a target port of DPU out of T possible (active) ports, by using also supporting communication lines (if available) from a total of S supporting lines, selected from a total number of N communication lines between the subscriber side and the network side, such that T+S=N. The target CPE unit for reception is selected according to priority data 180 (FIG. 4). The dynamic signal combiner is represented by a corresponding signal combining matrix having elements that are signal combining coefficients (equation (9)), and whose dimensions are N columns times T rows, where each row is selected for a particular time period and is defined as an active row that is associated with optimization of the bit-rate for the respective target CPE unit. Dynamic selection involves conferring a non-zero gain value to an output of the dynamic signal combiner that corresponds to the target CPE unit, while conferring zero gain values corresponding to other DPU ports that are not the target DPU port.

Possible schemes for the signal combiner include: optimal (weighted) phase combining, linear combining of signals in general, zero-forcing (ZF) signal combining, minimum-mean-squared-error (MMSE) signal combining, minimum-maximum (MIN-MAX) signal combining, beam-steering toward a target DPU port, and other diversity signal combining techniques (etc.). Hybrid VCE 104 is configured to perform gain adaptation after construction of the at least one dynamic signal combiner (represented by signal cancelling matrix).

Once DRA 106 determines the allocation, and hybrid VCE 104 determines the vectoring coefficients, management processor 102 (FIG. 1) is further configured and operative to determine a time at which the determined dynamic vectoring coefficients by hybrid VCE 104 shall take effect for related parameters such as the bit-loading table (BLT) at the network side and subscriber side (simultaneously). Specifically, management processor 102 determines when a determined vectoring configuration (i.e., in the DS direction: at least one dynamic precoder defined by respective dynamic precoding coefficients, and a steady-state precoder defined by steady-state precoding coefficients; and in the US direction: at least one dynamic signal combiner defined by respective signal combining coefficients, and a steady-state signal combiner defined by steady-state combiner coefficients) shall take effect by in a coordinated manner so that both the DPU and the CPE units employ the determined dynamic vectoring configuration (for those applicable CPE units) at the same time for the related parameters such as BLT. For this purpose, management processor 102 typically employs DPU-to-CPE protocols (such as online reconfiguration (OLR)) to align the determined vectoring coefficients as including BLT and gain tables at both ends of the communication lines (i.e., network and subscriber sides). The determined vectoring coefficients may be either one of at least partially updated (i.e., modified, changed) with respect to the previous coefficients, may be entirely new coefficients (e.g., as in the case of first use), or may be unchanged with respect to the previously determined coefficients.

Figure 10:
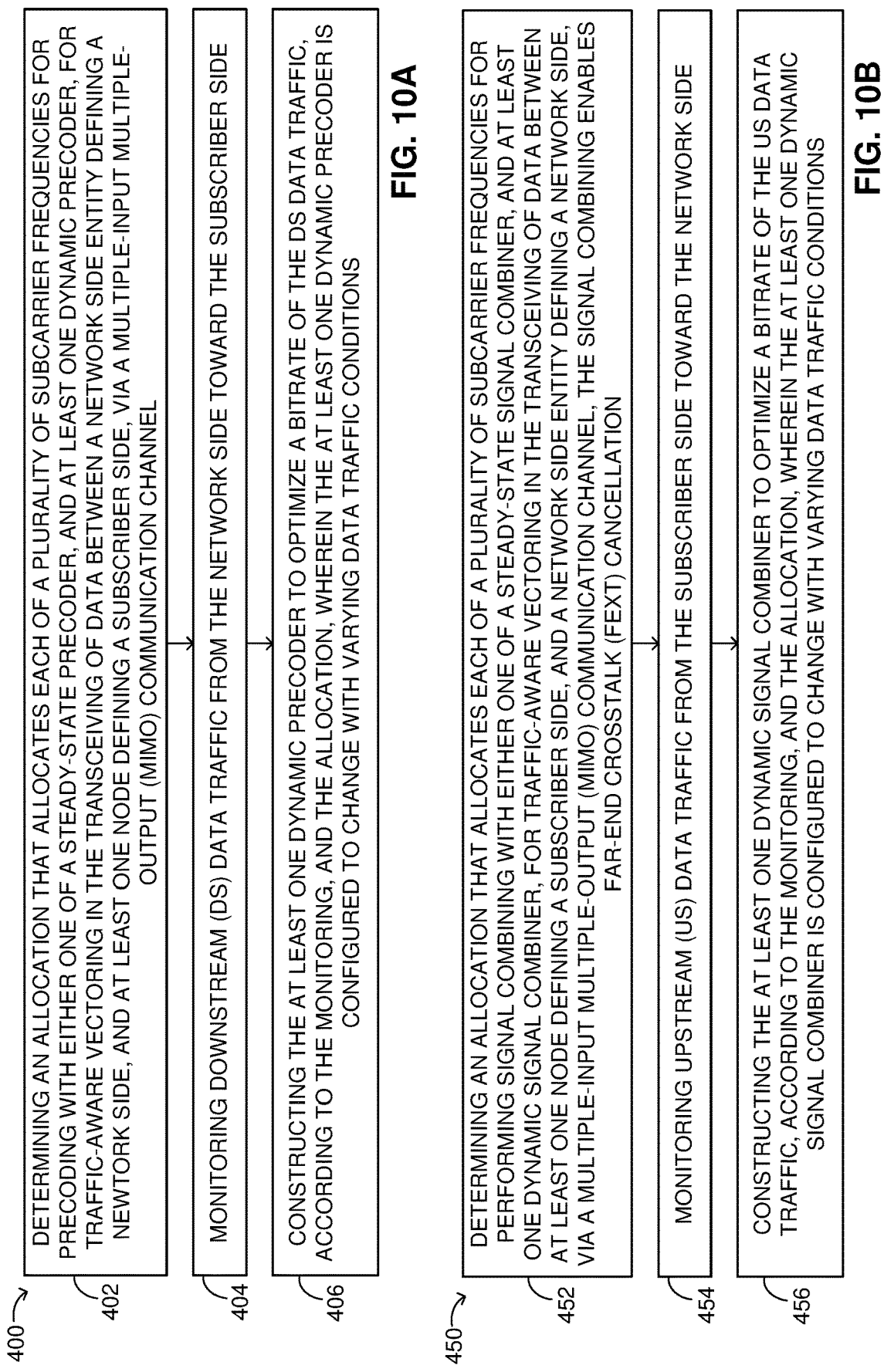
FIG. 10A is a schematic block diagram of a method, employing traffic-aware vectoring in a downstream (DS) direction, constructed and operative according to the disclosed technique.
FIG. 10B is a schematic block diagram of a method, employing traffic-aware vectoring in an upstream (US) direction, constructed and operative according to the disclosed technique.

Reference is now made to FIG. 10A. FIG. 10A is a schematic block diagram of a method, employing traffic-aware vectoring in a downstream (DS) direction, generally referenced 400, constructed and operative according to the disclosed technique. Method 400 initiates with procedure 402. In procedure 402, an allocation is determined that allocates each of a plurality of subcarrier frequencies for precoding with either one of a steady-state precoder, and at least one dynamic precoder for traffic-aware vectoring in transceiving of data between a network side entity defining a network side, and at least two nodes defining a subscriber side, via a multiple-input multiple-output (MIMO) communication channel, over the plurality of subcarrier frequencies. With reference to FIGS. 1, 2, 5A, 5B, 5C, 6, 7, and 9, DRA controller 106 (FIGS. 1 and 2) determines an allocation that allocates a plurality of subcarrier frequencies (FIGS. 5B, 5B, 5C, 6 and 9) along subcarrier frequency axis 202 to either one of steady state vectoring domain 204 (FIGS. 5A, 5B, and 5C), and dynamic vectoring domain 206 (FIGS. 5A, 5B, and 5C) for precoding with either one of steady-state precoder 270 (FIG. 7), and at least one dynamic precoder 352 (FIG. 9) in the transceiving (transmission) of data between DLSAM (FIG. 1) and CPE units 124$_1$, 124$_2$, 124$_3$, . . . , 124$_N$ (FIGS. 1 and 2) via MIMO channel (i.e., communication lines 120$_1$, 120$_2$, 120$_3$, . . . , 120$_N$) and the subcarrier frequencies (e.g., FIGS. 6 and 9).

In procedure 404, downstream (DS) data traffic is monitored from the network side toward the subscriber side. With reference to FIGS. 1 and 2, DRA controller 106 (FIGS. 1 and 2) monitors DS data traffic flow from DSLAM (FIG. 1) toward CPE units 124$_2$, 124$_3$, . . . , 124$_N$ (FIGS. 1 and 2).

In procedure 406, at least one dynamic precoder is constructed so to optimize a bitrate of the DS data traffic, according to the monitoring, and the allocation, wherein the at least one dynamic precoder is configured to change with varying data traffic conditions. With reference to FIGS. 1, 4 and 9, hybrid VCE 104 (FIG. 1) constructs at least one dynamic precoder 352, according to equation (8), so as to optimize the bitrate of DS data traffic of e.g., CPE #2 124$_2$ according to monitoring procedure 404 and allocating procedure 402, wherein the at least one dynamic precoder 352 changes in accordance with selection of active column 354 (FIG. 9), according to varying DS data traffic conditions of CPE units 124$_2$, 124$_3$, . . . , 124$_N$ (FIGS. 1 and 9), and priority data 180 (FIG. 4) specifying an order of priority of CPE units for which communication performance (e.g., bitrate) require optimizing.

Reference is now made to FIG. 10B. FIG. 10B is a schematic block diagram of a method, employing traffic-aware vectoring in an upstream (US) direction, generally referenced 450, constructed and operative according to the disclosed technique. Method 450 initiates with procedure 452. In procedure 452, an allocation is determined that allocates each of a plurality of subcarrier frequencies for performing signal combining with either one of a steady-state signal combiner, and at least one dynamic signal combiner for traffic-aware vectoring in transceiving of data between at least two nodes defining a subscriber side and a network side entity defining a network side, via a multiple-input multiple-output (MIMO) communication channel, over the plurality of subcarrier frequencies, wherein the signal combining enables far-end crosstalk (FEXT) cancellation. With reference to FIGS. 1, 2, 5A, 5B, 5C, 6, 7, and 9, DRA controller 106 (FIGS. 1 and 2) determines an allocation that allocates a plurality of subcarrier frequencies (FIGS. 5B, 5B, 5C, 6 and 9) along subcarrier frequency axis 202 to either one of steady state vectoring domain 204 (FIGS. 5A, 5B, and 5C), and dynamic vectoring domain 206 (FIGS. 5A, 5B, and 5C) for signal combining with either one of steady-state signal combiner 312 (FIG. 8), and at least one dynamic signal combiner 312 (FIG. 8) (i.e., the differentiation is dependent on operation) in the transceiving (transmission) of data between CPE units 124$_1$, 124$_2$, 124$_3$, . . . , 124$_N$ (FIGS. 1 and 2) and DLSAM (FIG. 1) and via MIMO channel (i.e., communication lines 120$_1$, 120$_2$, 120$_3$, . . . , 120$_N$) and the subcarrier frequencies (e.g., FIGS. 6 and 9). Block 316 (FIG. 8) that includes signal combiner 312 and FEQ block 314 is configured and operative to cancel FEXT in the US direction.

In procedure 454, upstream (US) data traffic is monitored from the subscriber side toward the network side. With reference to FIGS. 1 and 2, DRA controller 106 (FIGS. 1 and 2) monitors US data traffic flow from CPE units 124$_2$, 124$_3$, . . . , 124$_N$ (FIGS. 1 and 2) toward DSLAM (FIG. 1).

In procedure 456, at least one dynamic signal combiner is constructed so to optimize a bitrate of the US data traffic, according to the monitoring, and the allocation, wherein the at least one dynamic signal combiner is configured to change with varying US data traffic conditions. With reference to FIGS. 1, 4 and 9, hybrid VCE 104 (FIG. 1) constructs at least one dynamic signal combiner 312 (FIG. 8) according to equation (9), so as to optimize the bitrate of US data traffic according to monitoring procedure 454 and allocating procedure 452, wherein the at least one dynamic signal combiner 312 changes in accordance with varying US data traffic conditions of CPE units 124$_2$, 124$_3$, . . . , 124$_N$ (FIGS. 1 and 9), and priority data 180 (FIG. 4) specifying an order of priority of CPE units for which communication performance (e.g., bitrate) require optimizing.

Figure 11:
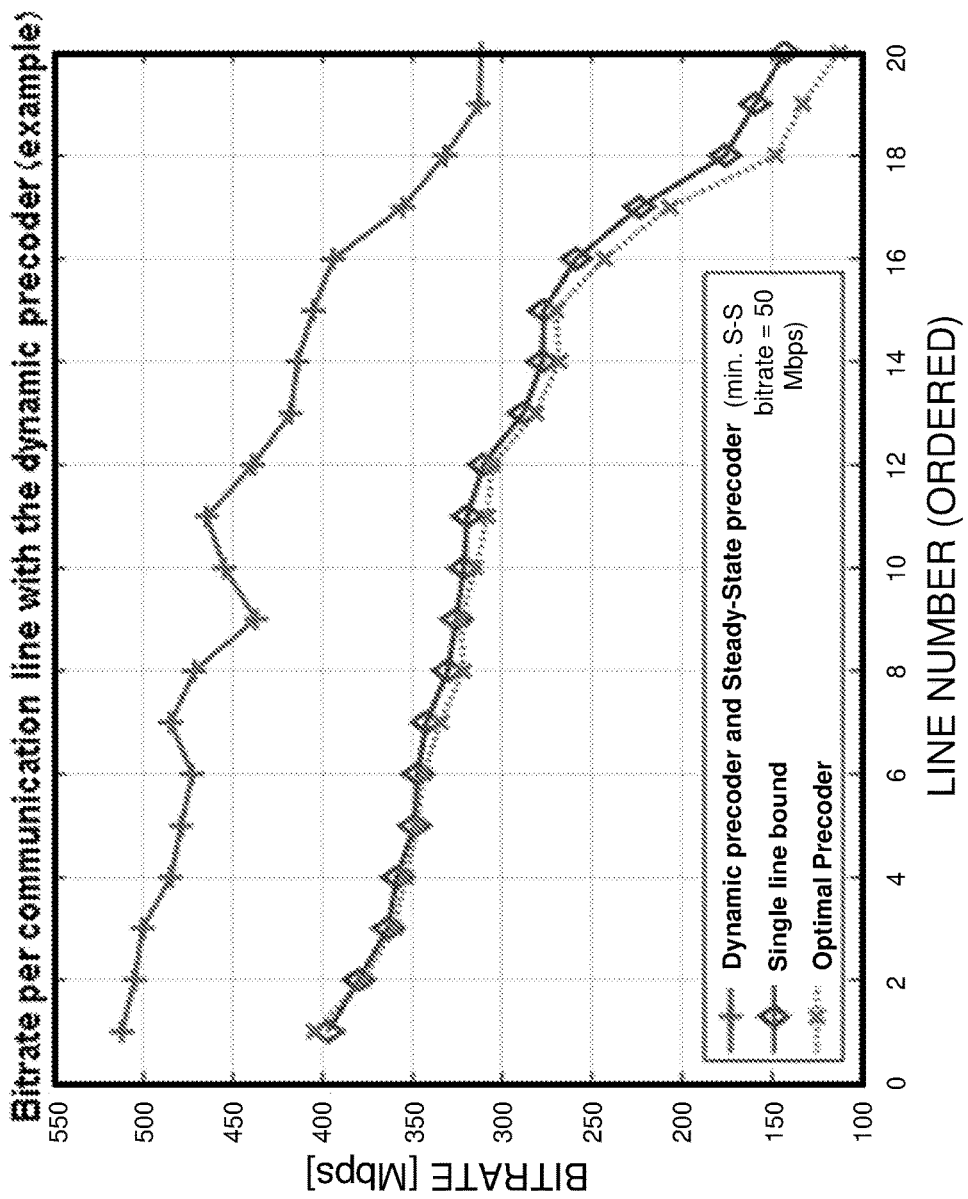
FIG. 11 is an illustration of predicted results obtained by employing dynamic vectoring in the DS direction using beam-steering for optimizing bitrate for a particular CPE unit (user) in comparison with other precoding techniques, in accordance with the principles of the disclosed technique.

Reference is now made to FIG. 11, which is an illustration, generally referenced 500, of predicted results obtained by employing dynamic vectoring in the DS direction using beam-steering for optimizing bitrate for a particular CPE unit (user) in comparison with other precoding techniques, in accordance with the principles of the disclosed technique. FIG. 11 shows communication performance (i.e., the bitrate) per communication line with dynamic precoding in the DS direction (employing beam-steering "all for one") as well as steady-state precoding (that supports and guarantees a SLA minimum bitrate of 50 Mpbs) in comparison with other precoding techniques in which the bitrate (vertical axis) is shown versus the number of communication lines (horizontal axis), in a MIMO channel having twenty communication lines in total. These results indicate that the bitrate per communication line using dynamic vectoring (i.e., precoding in this example) employing beam-steering exceeds the bitrate of the single communication line bound.

It will be appreciated by persons skilled in the art that the disclosed technique is not limited to what has been particularly shown and described hereinabove. Rather the scope of the disclosed technique is defined only by the claims, which follow.

The invention claimed is:

1. A method employing traffic-aware vectoring for transceiving data between a network side entity defining a network side, and at least two nodes defining a subscriber side, via a multiple-input multiple-output (MIMO) communication channel, over a plurality of subcarrier frequencies, the method comprising:
   determining an allocation that allocates each of said subcarrier frequencies for precoding with either one of a steady-state precoder, and at least one dynamic precoder;
   monitoring downstream (DS) data traffic from said network side entity toward said at least two nodes; and
   constructing said at least one dynamic precoder to optimize a bit-rate of said DS data traffic, according to said monitoring, and said allocation;
   wherein said at least one dynamic precoder is configured to change with varying said data traffic conditions.

2. The method according to claim 1, wherein said at least one dynamic precoder is associated with at least one dynamic precoding frequency band that includes at least one subcarrier frequency, where a collection of all said subcarrier frequencies that are allocated to said at least one dynamic precoder constitute a dynamic precoder domain,
   wherein said steady-state precoder is associated with at least one steady-state precoding frequency band that includes at least one subcarrier frequency, where a collection of all said subcarrier frequencies that are allocated to said steady-state precoder constitute a steady-state precoder domain
   wherein said dynamic precoding domain and said steady-state precoding domain do not overlap in frequency at the same time,
   wherein said steady-state precoding domain resides in a lower part of a spectrum of subcarrier frequencies, and said dynamic precoding domain resides in a higher part of said spectrum.

3. The method according to claim 1, wherein said steady-state precoder does not depend on time-varying DS data traffic requirements.

4. The method according to claim 1, wherein said at least one dynamic precoder and said steady-state precoder employ a precoding scheme selected from a list consisting of:
   linear precoding (LP);
   non-linear precoding (NLP);
   zero-forcing (ZF);
   minimum-mean-squared-error (MMSE);
   beam-steering to a target said at least one node; and
   minimum-maximum (MIN-MAX) precoding.

5. The method according to claim 1, further comprising:
   determining a time when said at least one dynamic precoder shall take effect by synchronizing use of an updated bit-loading table (BLT) at said subscriber side and at said network side; and
   coordinating a concurrent update of at least said BLT for said network side and said subscriber side.

6. A system employing traffic-aware vectoring for transceiving data between a network side entity defining a network side, and at least two nodes defining a subscriber side, via a multiple-input multiple-output (MIMO) communication channel, over a plurality of subcarrier frequencies, the system comprising:
   a dynamic resource allocation (DRA) controller, configured to monitor downstream (DS) data traffic from said network side entity toward said at least two nodes, to generate corresponding control parameters, and to determine an allocation that allocates each of said subcarrier frequencies for precoding with either one of a steady-state precoder, and at least one dynamic precoder; and
   a hybrid vectoring control entity (VCE), for constructing said at least one dynamic precoder for optimizing a bit-rate of said DS data traffic, according to monitored said DS data traffic, and said allocation;
   wherein said dynamic precoder is configured to change with varying said data traffic conditions according to said control parameters.

7. The system according to claim 6, wherein said at least one dynamic precoder is associated with at least one dynamic precoding frequency band that includes at least one subcarrier frequency, where a collection of all said subcarrier frequencies that are allocated to said at least one dynamic precoder constitute a dynamic precoder domain,
   wherein said steady-state precoder is associated with at least one steady-state precoding frequency band that includes at least one subcarrier frequency, where a collection of all said subcarrier frequencies that are allocated to said steady-state precoder constitute a steady-state precoder domain,
   wherein said dynamic preceding domain and said steady-state precoding domain do not overlap in frequency at the same time,
   wherein said steady-state precoding domain resides in a lower part of a spectrum of subcarrier frequencies, and said dynamic precoding domain resides in a higher part of said spectrum.

8. The system according to claim 6, wherein said steady-state precoder does not depend on time-varying DS data traffic requirements.

9. The system according to claim 6, wherein said at least one dynamic and said steady-state precoder precoder employ a precoding scheme selected from a list consisting of:
   linear precoding (LP);
   non-linear precoding (NLP);
   zero-forcing (ZF);
   minimum-mean-squared-error (MMSE);
   beam-steering to a target said at least one node; and
   minimum-maximum (MIN-MAX) precoding.

10. The system according to claim 6, further comprising a management processor enabled for communicative coupling with said hybrid VCE, said management processor is configured to:
    determine a time when said at least one dynamic precoder shall take effect by synchronizing use of a bit-loading table (BLT) at said subscriber side and at said network side; and
    coordinating a concurrent update of at least said BLT for said network side and said subscriber side.

11. A method employing traffic-aware vectoring for transceiving data between a network side entity defining a network side and at least two nodes defining a subscriber side, via a multiple-input multiple-output (MIMO) communication channel, over a plurality of subcarrier frequencies, the method comprising:
    determining an allocation that allocates each of said subcarrier frequencies for performing signal combining with either one of a steady-state signal combiner, and at least one dynamic signal combiner, said signal combining enables far-end crosstalk (FEXT) cancellation;
monitoring upstream (US) data traffic from said at least two nodes toward said network side entity; and
constructing said at least one dynamic signal combiner to optimize a bit-rate of said US data traffic, according to said monitoring, and said allocation;
wherein said at least one dynamic signal combiner is configured to change with varying said data traffic conditions.

12. The method according to claim 11, wherein said at least one dynamic signal combiner is associated with at least one dynamic signal combiner frequency band that includes at least one subcarrier frequency, where a collection of all said subcarrier frequencies that are allocated to said at least one dynamic signal combiner constitute a dynamic combiner domain,
wherein said steady-state signal combiner is associated with at least one steady-state signal combiner frequency band that includes at least one subcarrier frequency, where a collection of all said subcarrier frequencies that are allocated to said steady-state signal combiner constitute a steady-state signal combiner domain,
wherein said dynamic signal combiner domain and said steady-state signal combiner domain do not overlap in frequency at the same time,
wherein said steady-state signal combiner domain resides in a lower part of a spectrum of subcarrier frequencies, and said dynamic signal combiner domain resides in a higher part of said spectrum.

13. The method according to claim 11, wherein said steady-state signal combiner does not depend on time-varying US data traffic requirements.

14. The method according to claim 11, wherein said at least one dynamic signal combiner and said steady-state signal combiner employ a signal combining scheme selected from a list consisting of:
 optimal (weighted) phase combining;
 linear signal combiner;
 zero-forcing (ZF) signal combining;
 minimum-mean-squared-error (MMSE) signal combining; and
 minimum-maximum (MIN-MAX) signal combining.

15. The method according to claim 11, further comprising:
 determining a time when said at least one dynamic signal combiner shall take effect by synchronizing use a bit-loading table (BLT) at said subscriber side and at said network side; and
 coordinating a concurrent update of at least said BLT for said network side and said subscriber side.

16. A system employing traffic-aware vectoring for transceiving data between a network side entity defining a network side, and at least two nodes defining a subscriber side, via a multiple-input multiple-output (MIMO) communication channel, over a plurality of subcarrier frequencies, the system comprising:
 a dynamic resource allocation (DRA) controller, configured to monitor upstream (US) data traffic from said at least two nodes toward said network side entity, to generate corresponding control parameters, and to determine an allocation that allocates each of said subcarrier frequencies for performing signal combining with either one of a steady-state signal combiner, and at least one dynamic signal combiner; and
 a hybrid vectoring control entity (VCE) for constructing said at least one dynamic signal combiner for optimizing a bit-rate of said US data traffic, according to monitored said US data traffic, and said allocation, wherein said signal combining enables far-end crosstalk (FEXT) cancellation;
 wherein said dynamic signal combiner is configured to change with varying said data traffic conditions according to said control parameters.

17. The system according to claim 16, wherein said at least one dynamic signal combiner is associated with at least one dynamic signal combiner frequency band that includes at least one subcarrier frequency, where a collection of all said subcarrier frequencies that are allocated to said at least one dynamic signal combiner constitute a dynamic signal combiner domain,
wherein said steady-state signal combiner is associated with at least one steady-state signal combiner frequency band that includes at least one subcarrier frequency, where a collection of all said subcarrier frequencies that are allocated to said steady-state signal combiner constitute a steady-state signal combiner domain,
wherein said dynamic signal combiner domain and said steady-state signal combiner domain do not overlap in frequency at the same time,
wherein said steady-state signal combiner domain resides in a lower part of a spectrum of subcarrier frequencies, and said dynamic signal combiner domain resides in a higher part of said spectrum.

18. The system according to claim 16, wherein said steady-state signal combiner does not depend on time-varying US data traffic requirements.

19. The method according to claim 16, wherein said at least one dynamic signal combiner and said steady-state signal combiner employ a signal combining scheme selected from a list consisting of:
 optimal (weighted) phase combining;
 linear signal combiner;
 zero-forcing (ZF) signal combining;
 minimum-mean-squared-error (MMSE) signal combining; and
 minimum-maximum (MIN-MAX) signal combining.

20. The system according to claim 16, further comprising a management processor enabled for communicative coupling with said hybrid VCE, said management processor is configured to:
 determine a time when at least one dynamic signal combiner shall take effect by synchronizing use of a bit-loading table (BLT) at said subscriber side and at said network side; and
 coordinating a concurrent update of at least said BLT for said network side and said subscriber side.

* * * * *